(12) United States Patent
Pavlatos

(10) Patent No.: US 8,876,930 B2
(45) Date of Patent: Nov. 4, 2014

(54) SINGLE/MULTIPLE GUARD(S)/CAP(S) AND/OR SCREEN(S) WITH ENGINE ATTACHED CHAMBER/MANIFOLD PARTICLE COLLECTOR

(76) Inventor: Marina Ellen Marinella Pavlatos, Buffalo Grove, IL (US)

( * ) Notice: Subject to any disclaimer, the term of this patent is extended or adjusted under 35 U.S.C. 154(b) by 1024 days.

(21) Appl. No.: 12/927,487

(22) Filed: Nov. 15, 2010

(65) Prior Publication Data
US 2011/0139000 A1    Jun. 16, 2011

Related U.S. Application Data

(63) Continuation-in-part of application No. 12/272,163, filed on Nov. 17, 2008, now Pat. No. 7,887,610, which is a continuation of application No. 11/692,640, filed
(Continued)

(30) Foreign Application Priority Data

Nov. 20, 2000    (EP) .................................... 00991684

(51) Int. Cl.
| | |
|---|---|
| *B01D 33/15* | (2006.01) |
| *F02G 3/00* | (2006.01) |
| *B01D 45/14* | (2006.01) |
| *F02C 7/055* | (2006.01) |
| *F02C 7/052* | (2006.01) |
| *B01D 45/12* | (2006.01) |
| *F02M 35/022* | (2006.01) |

(52) U.S. Cl.
CPC .............. *B01D 45/12* (2013.01); *B01D 45/14* (2013.01); *F02C 7/055* (2013.01); *F02C 7/052* (2013.01); *F02M 35/022* (2013.01); *B01D 2279/60* (2013.01)

USPC .................. 55/306; 55/394; 55/396; 55/401; 55/406; 55/521; 60/39.092

(58) Field of Classification Search
CPC ........ B01D 29/50; B01D 29/56; B01D 33/35; B01D 33/41; B01D 45/12; B01D 46/00; B01D 46/0023; B01D 50/00
USPC .................. 55/306, 394, 396, 401, 406, 521; 60/39.92, 39.092
See application file for complete search history.

(56) References Cited

U.S. PATENT DOCUMENTS

| | | |
|---|---|---|
| 2,695,074 A | 11/1954 | Kelly |
| 2,931,460 A | 4/1960 | McEachern |

(Continued)

FOREIGN PATENT DOCUMENTS

| | | |
|---|---|---|
| FR | 2588311 | 4/1987 |
| FR | 2603946 | 3/1988 |

(Continued)

*Primary Examiner* — Robert A Hopkins

(57) ABSTRACT

This invention relates in general to a fixed guard(s)/cap(s) and/or screen(s) apparatus (single and/or double formation) shall effect multiple aspects for example the nacelle and inlet for numerous craft, jets, turbojet, turboprop and turboshaft engines—(Helicopters and other VTOL aircraft) such as power plants or the like. This apparatus contains the rotational system(s) which may be applied to the engine shaft attached apparatus and/or pole that allows the mechanism to function by self-induced movement, without limiting engine thrust. Additional security measures have been introduced to the guard(s), cap(s) and/or screen(s) apparatus, which includes a gaseous intake cavity, centrifuge, chamber, manifold and processes—static free and or purification chamber, and a particle collector without limiting engine thrust.

30 Claims, 22 Drawing Sheets

Related U.S. Application Data on Mar. 28, 2007, now Pat. No. 7,615,087, which is a continuation of application No. 11/936,459, filed on Nov. 7, 2007, now Pat. No. 7,566,352, which is a continuation of application No. 11/495,743, filed on Jul. 28, 2006, now Pat. No. 7,494,522, which is a continuation of application No. 11/692,623, filed on Mar. 28, 2007, now Pat. No. 7,422,611, which is a continuation of application No. 10/977,014, filed on Oct. 29, 2004, now Pat. No. 7,160,345, which is a continuation of application No. 10/148,507, filed as application No. PCT/US00/30145 on Nov. 20, 2000, now Pat. No. 6,872,232.

(60) Provisional application No. 60/167,163, filed on Nov. 23, 1999.

(56) References Cited

U.S. PATENT DOCUMENTS

| | | | |
|---|---|---|---|
| 2,944,631 A | 7/1960 | Kerry et al. | |
| 2,969,941 A | 1/1961 | Hobart, Jr. | |
| 3,121,545 A | 2/1964 | Meleton | |
| 3,148,043 A | 9/1964 | Richardson et al. | |
| 3,196,598 A | 7/1965 | Olson | |
| 3,302,395 A | 2/1967 | Robbins | |
| 3,426,981 A | 2/1969 | Allcock | |
| 3,444,672 A | 5/1969 | Alsobrooks | |
| 3,521,431 A | 7/1970 | Connors et al. | |
| 3,616,616 A | 11/1971 | Flatt | |
| 3,751,907 A * | 8/1973 | Anderson | 60/39.092 |
| 3,766,719 A | 10/1973 | McAnally, III | |
| 3,832,086 A | 8/1974 | Hull, Jr. et al. | |
| 3,871,844 A | 3/1975 | Calvin, Sr. | |
| 4,002,024 A | 1/1977 | Nye et al. | |
| 4,149,689 A | 4/1979 | McDonald | |
| 4,261,168 A | 4/1981 | Grigorian et al. | |
| 4,265,646 A | 5/1981 | Weinstein et al. | |
| 4,527,387 A | 7/1985 | Lastrina et al. | |
| 4,617,028 A | 10/1986 | Ray et al. | |
| 4,833,879 A | 5/1989 | Verduyn et al. | |
| 5,046,458 A | 9/1991 | Kronich | |
| 5,411,224 A | 5/1995 | Dearman et al. | |
| 6,319,304 B1 | 11/2001 | Moredock | |

FOREIGN PATENT DOCUMENTS

| | | |
|---|---|---|
| GB | 663194 | 12/1951 |
| NL | 1001992 | 6/1997 |

* cited by examiner

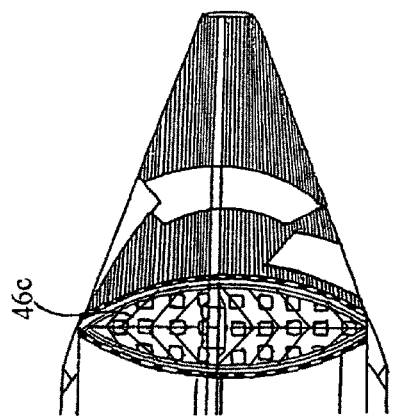
FIG. 4
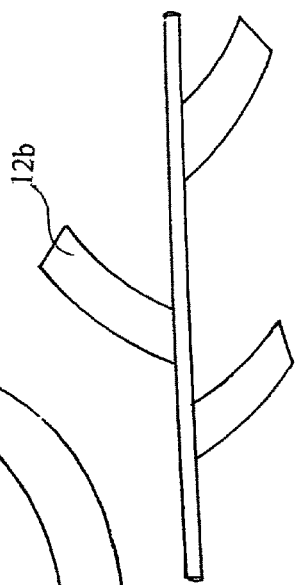
FIG. 7
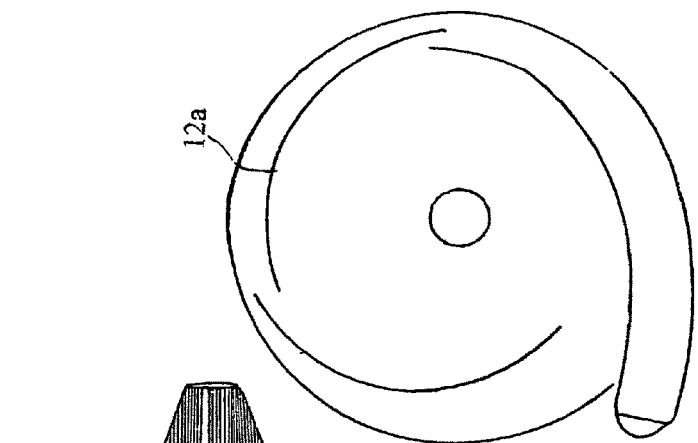
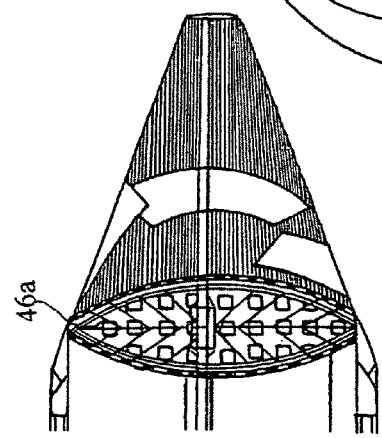
FIG. 3
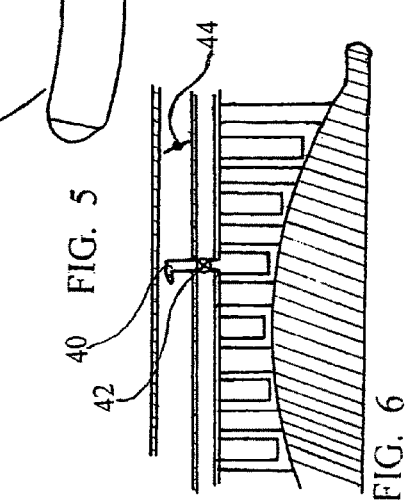
FIG. 5
FIG. 6

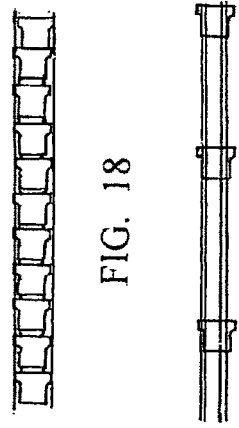
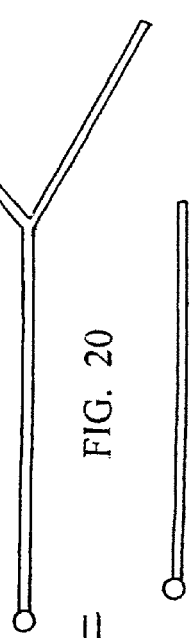
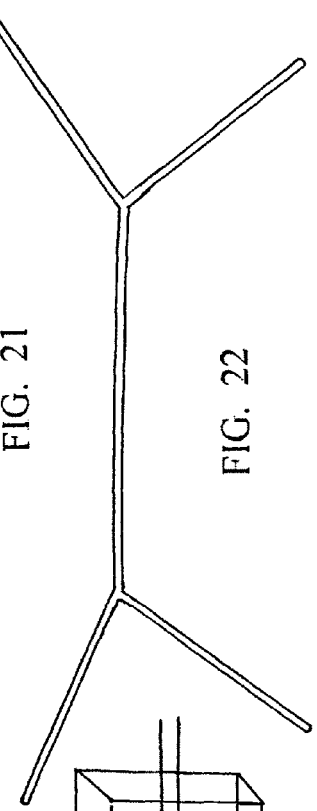
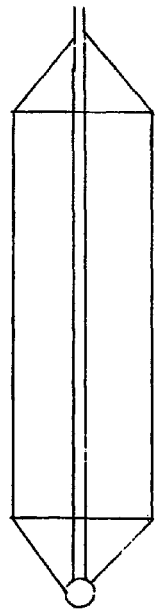
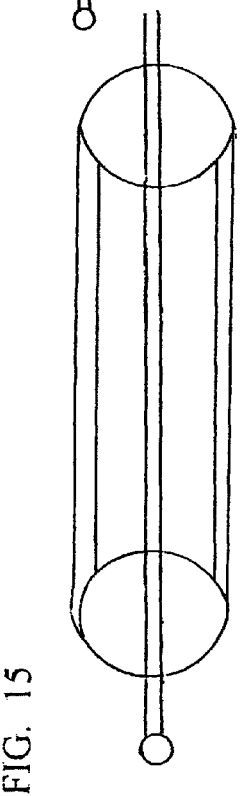
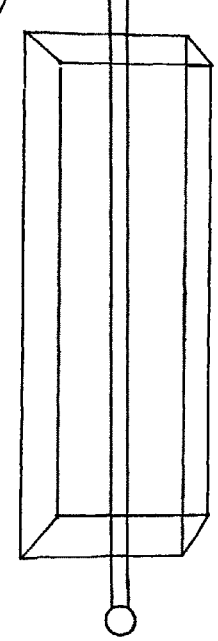
FIG. 18
FIG. 19
FIG. 20
FIG. 21
FIG. 22
FIG. 15
FIG. 16
FIG. 17

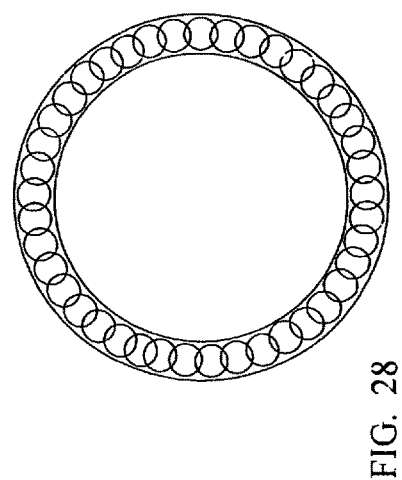
FIG. 28
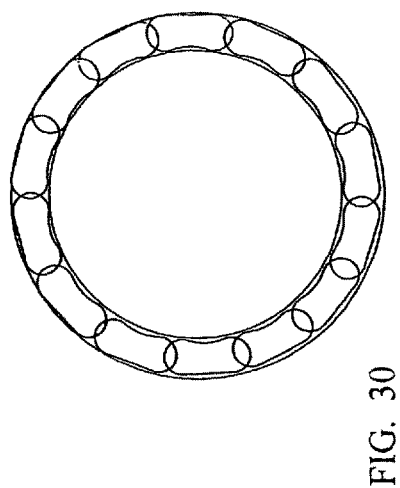
FIG. 30
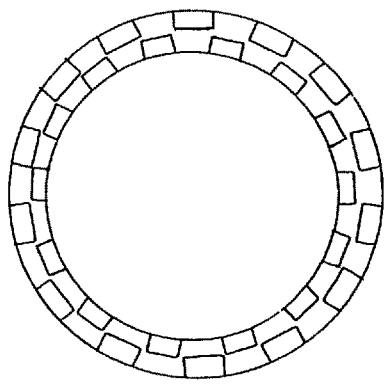
FIG. 27
FIG. 29

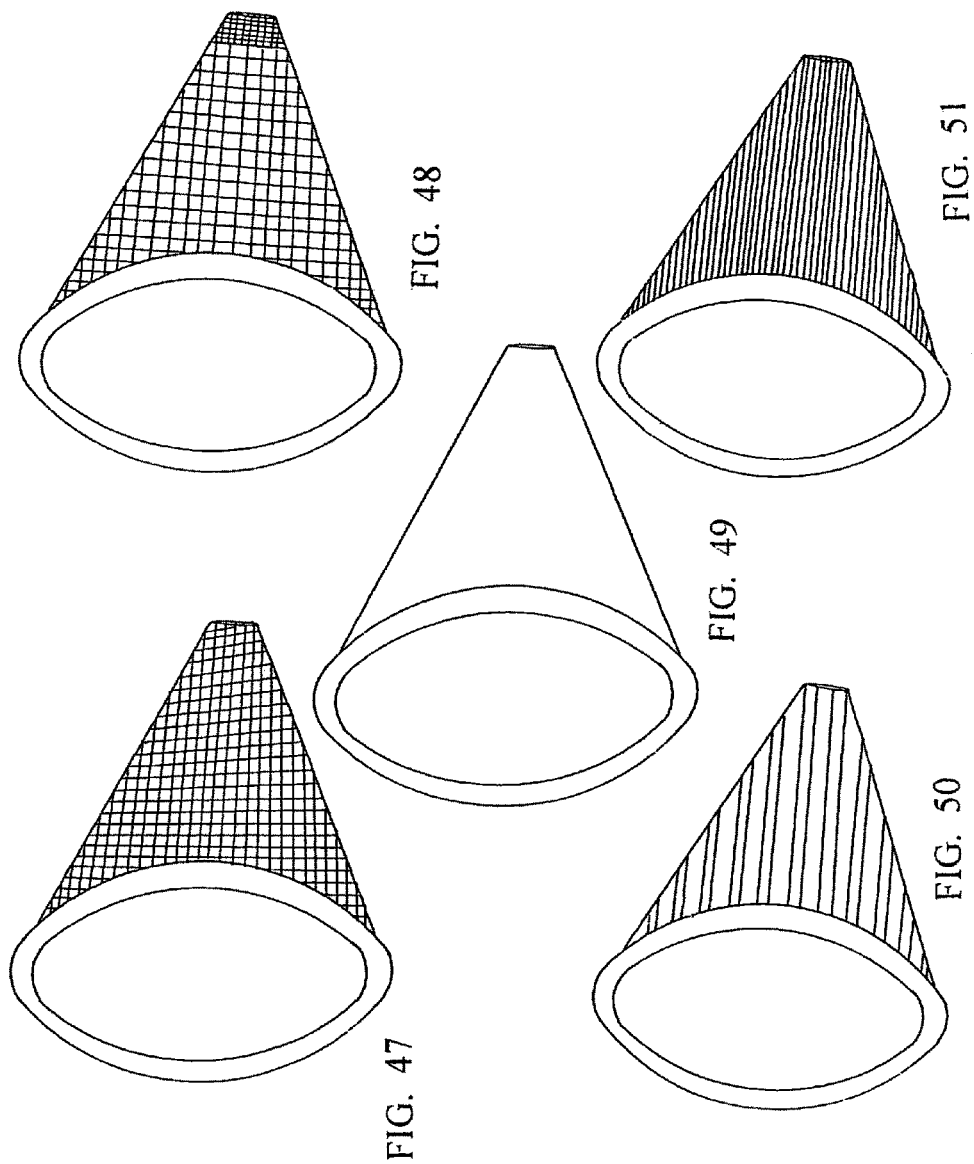

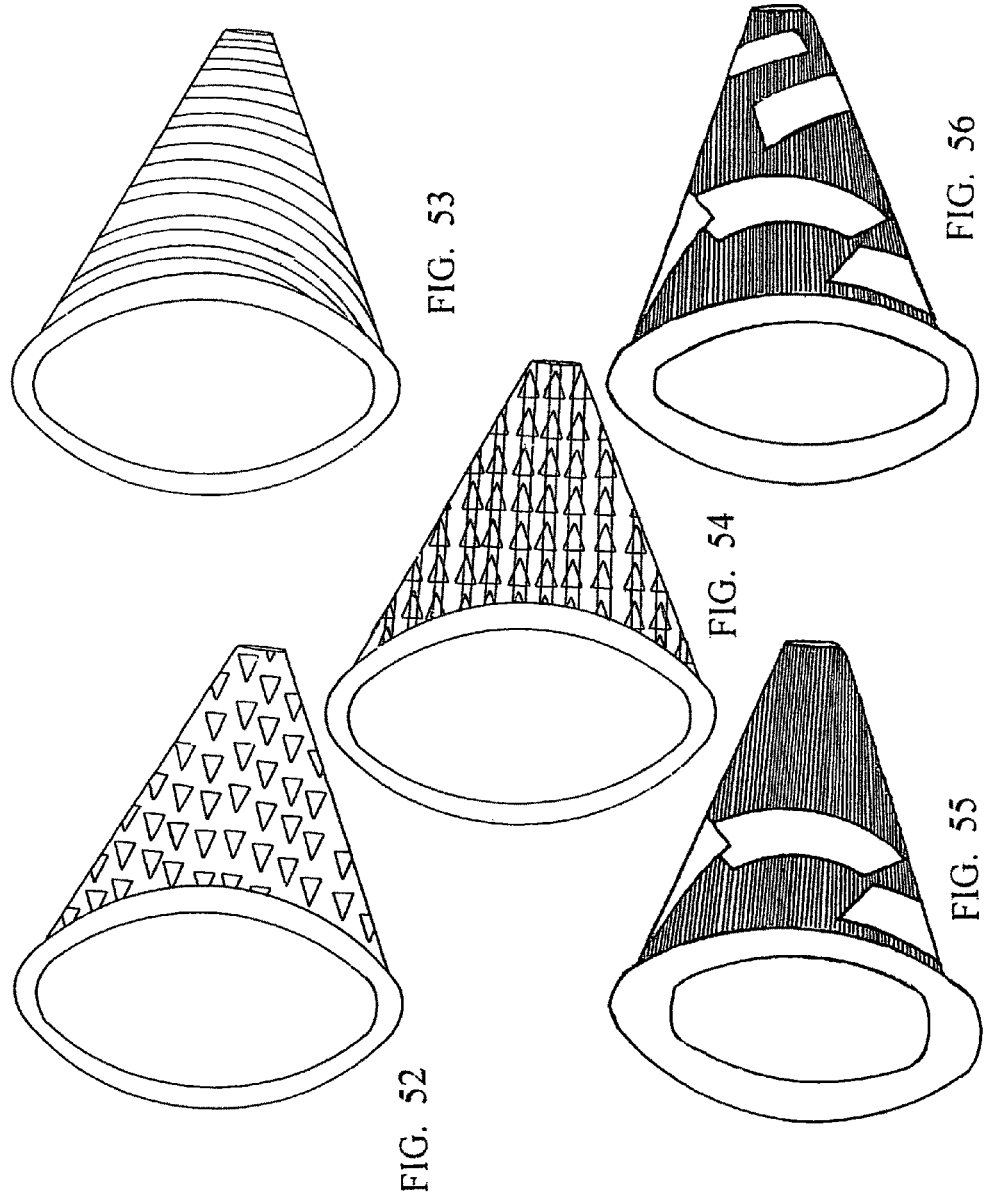

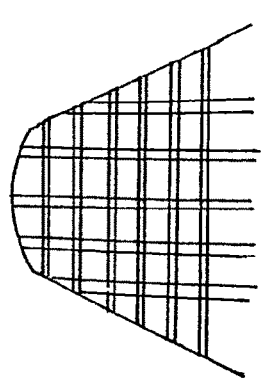
FIG. 63
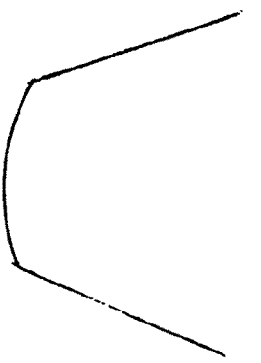
FIG. 62
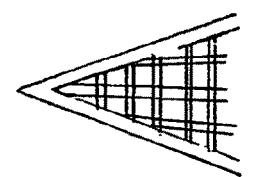
FIG. 61
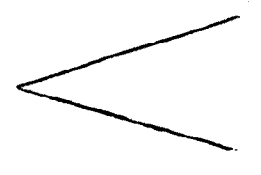
FIG. 60
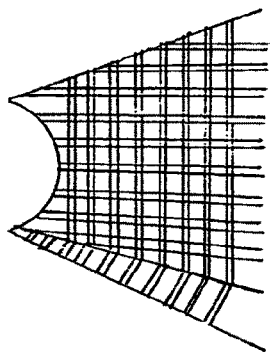
FIG. 67
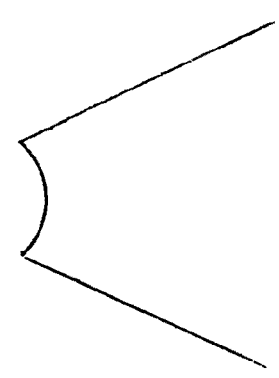
FIG. 66
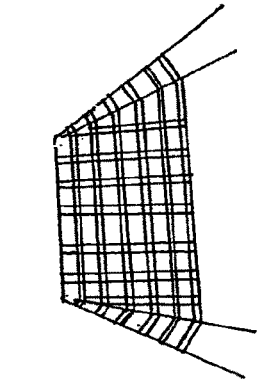
FIG. 65
FIG. 64

SINGLE/MULTIPLE GUARD(S)/CAP(S) AND/OR SCREEN(S) WITH ENGINE ATTACHED CHAMBER/MANIFOLD PARTICLE COLLECTOR

REFERENCE TO RELATED APPLICATIONS

This application is based upon and claims priority of U.S. Provisional Patent Application Applicant Ser. No. 60/167,163 filed on Nov. 23, 1999.

CROSS-REFERENCE TO RELATED APPLICATIONS

This patent application is a continuation-in-part of commonly owned U.S. patent application—Notice of Allowance Awarded Ser. No. 12/272,163, filled Nov. 17, 2008 now U.S. Pat. No. 7,887,610 which is a continuation of U.S. patent application Ser. No. 11/692,640 filed Mar. 28, 2007 now U.S. Pat. No. 7,615,087 which is a continuation of U.S. patent application Ser. No. 11/936,459 filed Nov. 7, 2007 now U.S. Pat. No. 7,566,352 which is a continuation of U.S. patent application Ser. No. 11/495,743 filed Jul. 28, 2006 now U.S. Pat. No. 7,494,522 which is a continuation of U.S. patent application Ser. No. 11/692,623 filed Mar. 28, 2007 now U.S. Pat. No. 7,422,611 which is a continuation of U.S. patent application Ser. No. 10/977,014 filed Oct. 29, 2004 now U.S. Pat. No. 7,160,345 which is a continuation of U.S. patent application Ser. No. 10/148,507 filed Jan. 9, 2003 now U.S. Pat. No. 6,872,232 which is the national stage of International Patent Application No. PCT/US00/30145, filed on Nov. 20, 2000, which claims the priority to U.S. Provisional Patent Application Ser. No. 60/167,163 filed on Nov. 23, 1999.

BACKGROUND OF THE INVENTION

1. Field of the Invention

The present invention relates to a system for preventing and/or separating foreign objects and/or particles from the gaseous fluid and or air. This type of gaseous fluid, foreign objects, and/or air separation effects cavity, chamber, nacelle, inlet and various parts of an engine and or motors. In particular, this invention relates in general to a single/multiple guard(s)/cap(s) and/or screen(s) with engine and or motor. Application of engine and or motor shaft apparatus and/or pole may be administered. Extensions/rods can be laced, for example, fixed/secured, adhered, positioned and/or attached to the guard(s), cap(s) and or screen(s); as well as to the engine and or motor (for example). With or without shaft extension(s) and/or pole apparatus, and/or rotational system may also be applied when needed (for example). The rotational system(s)-functions with complete, pivot and/or partial movement (for example) for the appropriate gas separation to occur—for cavity, chamber, nacelle, inlet and various parts of an engine and or motor. This application may be used for various nacelles, inlets, and for numerous applications to engines, motors, jets, turbojet, turbojet, turboprop, and turboshaft engines such as aircraft as well as various power plants and or the like. The addition of the cavity which produces a new type of centrifuging process and/or manifold particle separator and collection device with or without the rotational system(s) would further add to security means without limiting engine and or motors capability. This capability would not limit engines thrust in various engines and or motors.

2. Description of the Prior Art

Problems are caused by ingestion of foreign objects, particles occur into cavity, chamber, nacelle, inlet, of various parts of an engine and or motor for example. This problem has been recognized, as disclosed in U.S. Pat. Nos. 2,695,074; 2,931,460; 2,944,631; 2,969,941; 3,121,545; 3,148,043; 3,426,981; 3,521,431; 3,616,616; 3,766,719; 3,832,086; 3,871,844; 4,149,689; 4,265,646; 4,617,028; 4,833,879; 5,046,458 and 5,411,224, all hereby incorporated by reference. However, such systems are known to limit engine thrust thus solving one problem and creating another. Since multiple craft, jets, turbojet, turboprop, and or turboshaft aircraft operate in various environments where foreign objects, particles cannot be controlled or removed, solutions must be found in order to solve this problem and allow the appropriate gas separation to occur for numerous craft, engines, motors, power plants and the like. Numerous craft have reported such problems with foreign objects, particles, yet constructive solutions have not been previously found. Such problems with the ingestion of foreign objects, particles, to engines and or motors causes damage in the compressor stage and to multiple other portions of an engine and or motor, power plant or the like. Such damage is immediate by partial or complete engine thrust surmounting to impairment of craft's flying capability and or motors capability and or power plants and the like capability. Since many of the systems used in multiple craft flying capability are limited in function of engine capability for example, two engines, such limitation can be detrimental and or fatal. The possible ingestion of various foreign objects and or particles without the appropriate gas separation in engines, motors, power plants and the like can have grave consequences. In craft that is taking-off (ascending) and or craft that is landing (descent) the consequences can be grave if formidable solutions are not administered.

The advent of gas separation for a gas turbine helicopters and other vehicles of take-off and landing capability VTOL/VSTOL craft, are also benefited by administering means in preventing foreign objects, matter, and or particles that may lead to a grave concern. Helicopters and other VTOL/VSTOL craft are also especially suited for certain low altitude missions on both land and sea, including combat support, search and rescue, and anti-submarine warfare; these foreign objects, matter, and or particles leaves the craft in a grave situation. Therefore, it is desirable to provide means for various craft in flight by providing solutions such as cavity, chamber, manifold, guard(s), for example to ensure the appropriate particle and or gas separation to occur with an effective collective system for various conditions; this shall ensure safety for all craft (without limiting engine thrust), power plants, and the like.

SUMMARY OF THE INVENTION

This invention relates in general to a guard(s), cap(s) and/or screen(s) apparatus (single and or multiple formation—along with the manipulations) for example the nacelle/inlet for numerous craft, such as engines, motors, jets, turbojet, turboprop, turboshaft engines—(Helicopters and VTOL/VSTOL craft), power plants and or the like. The guard(s), cap(s) and/or screen(s) minimize if not eliminate entry of foreign objects, matter, particles into the nacelle, inlet thereby allowing the function of the craft to operate respectively. In order for the appropriate function to occur gas separation and or particle separation must take place. In accordance with an important aspect of the invention, system(s) may be implemented with or without treads/threads (for example)—(along with the manipulations thereof) that would allow the guard(s), cap(s) and/or screen(s) to function accordingly for gas separation and or particle separation to occur. The rotational system(s) and the guard(s), cap(s) and/or screen(s), shall function with or without the invention of the engine shaft apparatus and extension(s) attachment and/or pole apparatus (along with the manipulations). The invention of the extensions/rods from guard(s), cap(s), and/or screen(s) shall be fixed/secured, adhered, positioned and or attached to the rotational system(s) and/or directly to the engine shaft extension(s) attachment and/or pole apparatus. The engine shaft extension(s) attachment and/or pole apparatus, with the extensions/rods from the guard(s), and/or screen(s) shall be fixed/secured, adhered and/or attached to the inward and/or outward portion of the guard(s), cap(s) and/or screen(s)—along with manipulations. Extensions/rods can also be attached latitudinal/longitudinal and or laced for example on the guard(s), cap(s) and/or screen(s) of the rotational system(s). Thus adhering fixed/secured and/or positioned to the rotational system(s) and/or directly to the engine shaft extension(s) attachment and/or pole apparatus—all systems are independent of each other. Opening and Closure of apparatus can be attained by center axis—for example of the guard(s), cap(s), and/or screen(s) in multiple sections (2 and/or odd numbers). Thus closure can occur upon engine shaft attached apparatus and/or pole in a folding or laced process for example along with extensions/rods. Allowance of continuous motion and/or function can occur from the engine. The engine shaft apparatus may be attached to the pole in a folding or laced process for example along with extensions/rod. Therefore, allowing continuous motion and/or function to occur from the engine without obstruction whether automated or not for induction process. All systems are independent of each other.

Security measures are taken with the centrifuge process; cavity, chamber, manifold particle collector with or without ejector system(s) with our without conduit means. Such security would ensure any doubt of foreign particles entry and destruction prior to reaching main engine components—compressor, combustor, a gas generator for example a turbine for the driving of an output shaft. The compressor and power driving output with or without the rotational system(s) of an engine shall ensure motion and/or function to occur from the engine with security system means without limiting engine thrust.

Additional measures for gas separation and or particle separation to occur is the gaseous intake cavity process exhibited by equation. The equation of $S = Fkc^3 A/4\ hG \rightarrow Energy$, this process defines and allows the gas separation and or particle separation to occur. S=Thermodynamic—gaseous fluid particles is ingested in the gaseous intake cavity system(s) and produces, F=Force—induced as gaseous fluid or particles is ingested and within gaseous intake cavity, k=constant of energy in a gaseous intake cavity, $c^3$=a constant with 3 spatial dimension that can take various dimensions and or be dimensionless, A=area of gaseous intake cavity divided by 4 h=forces defined as strong, weak, electromagnetic, and gravitational, G=gravity—gravitational pull of said so forces and particles. This equation yields energy=defined as electromagnetic, electrostatic, electrochemical, and thermodynamic.

DESCRIPTION OF THE DRAWING

These and other advantages of the present invention will be readily understood with reference to the following specification and attached drawing wherein:

FIG. 3 shows an isometric partial expanded view of a multi vane double guards, caps and or screens with engine attached apparatus and/or pole, with rotational systems. Centrifuge chamber/manifold particle collector-separator with shown with expanded as well as multiple extensions/rods (exhibited in the inward position towards the security apparatus);

FIG. 4 shows an isometric partial expanded view of a multi vane double guard, caps, and/or screens with engine attached apparatus and/or pole, with rotational systems. Centrifuge chamber manifold particle collector-separator with shown expanded as well as multiple extensions/rods (exhibited in the outward position of the security apparatus);

FIG. 5 shows a cross-sectional view of separator.

FIG. 6 shows additional ejector system.

FIG. 7 shows the manifold sectional, engine attached apparatus and/or pole-(apparatus can be single, or attached, fixed/secured on the engine attached apparatus and/or pole, or fixed secured on the guard(s), cap(s) and/or screen(s). The manifold may also include a type of mesh—two or more wires to further allow gas separation and or particle separation to take place. two or more wires to further allow gas separation and or particle separation to take place.

FIG. 15 shows the engine shaft extension security attachment and/or pole, diamond formation (for example);

FIG. 16 shows the engine shaft extension security attachment and/or pole cylindrical form (for example);

FIG. 17 shows the engine shaft extension security attachment and/or pole, in rectangular form (for example);

FIG. 18 shows the multiple section engine attachment for retraction process of the apparatus and/or pole;

FIG. 19 shows the multiple section engine attachment for retraction process of the apparatus and/or pole;

FIG. 20 shows longitudinal apparatus and/or pole for numerous dual inlets, with a dual extending apparatus from the pole for inlet-power plants and the like;

FIG. 21 shows longitudinal apparatus and/or pole for inlet-power plants and the like;

FIG. 22 shows longitudinal apparatus and/or pole for numerous dual inlets, with a dual extending apparatus for both sides of the pole for the inlet-power plants and the like;

FIG. 27 rotational ring with interlocked form (can also be inverted);

FIG. 28 rotational ring as coiled form (can also be inverted without ring but may take ring formation or other forms—for example as well as numerous coils);

FIG. 29 rotational ring as slotted form (can also be inverted on the outside as well as internal portion of the ring—for example as well as numerous slots);

FIG. 30 rotational ring as chain linked form (can also be inverted without ring but may take ring formation or other forms—for example as well as numerous links);

FIGS. 46a, 46b, 46c, and 46d consists of variance in meshing—wire mesh:

Figure 58:
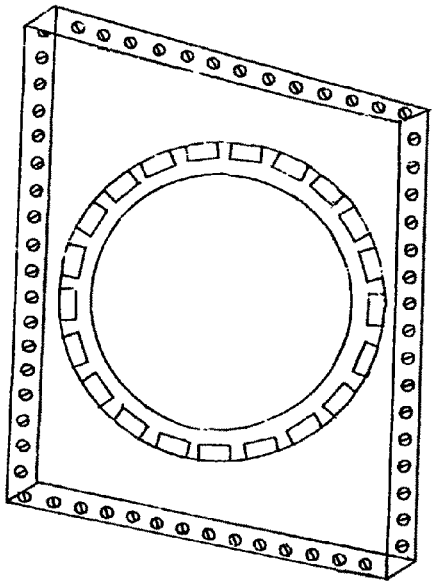
Figure 59:
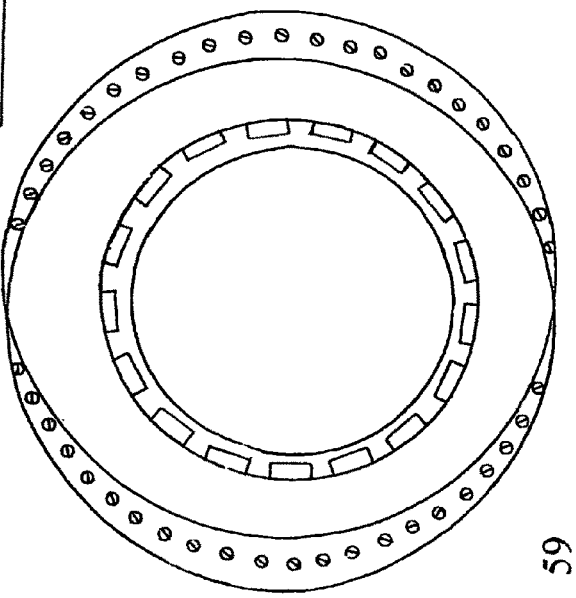
Figure 57:
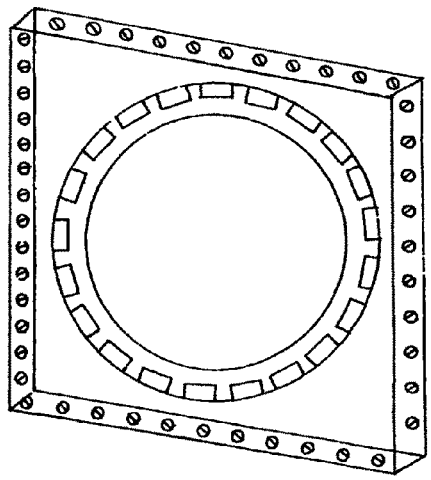
Figure 68:
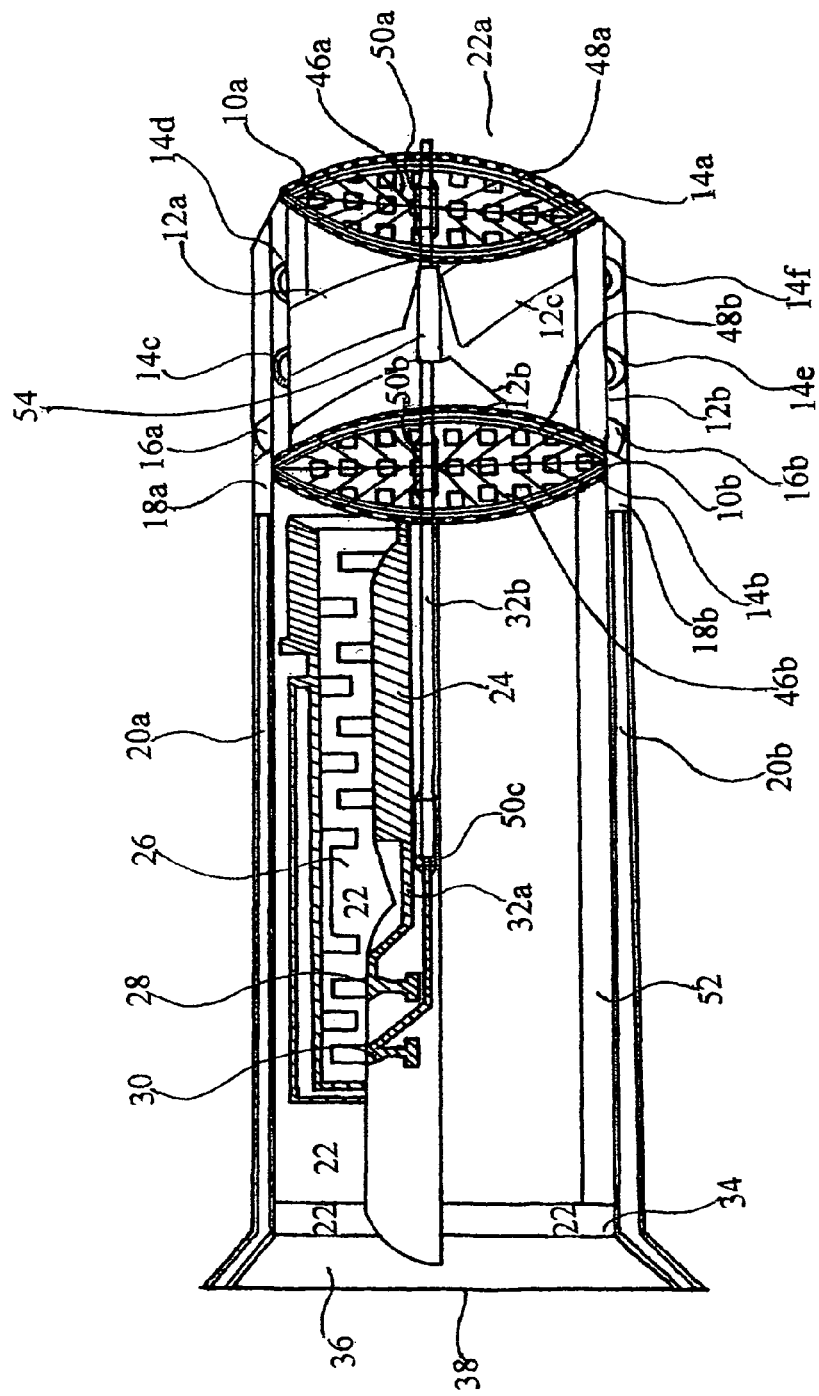
Figure 69:
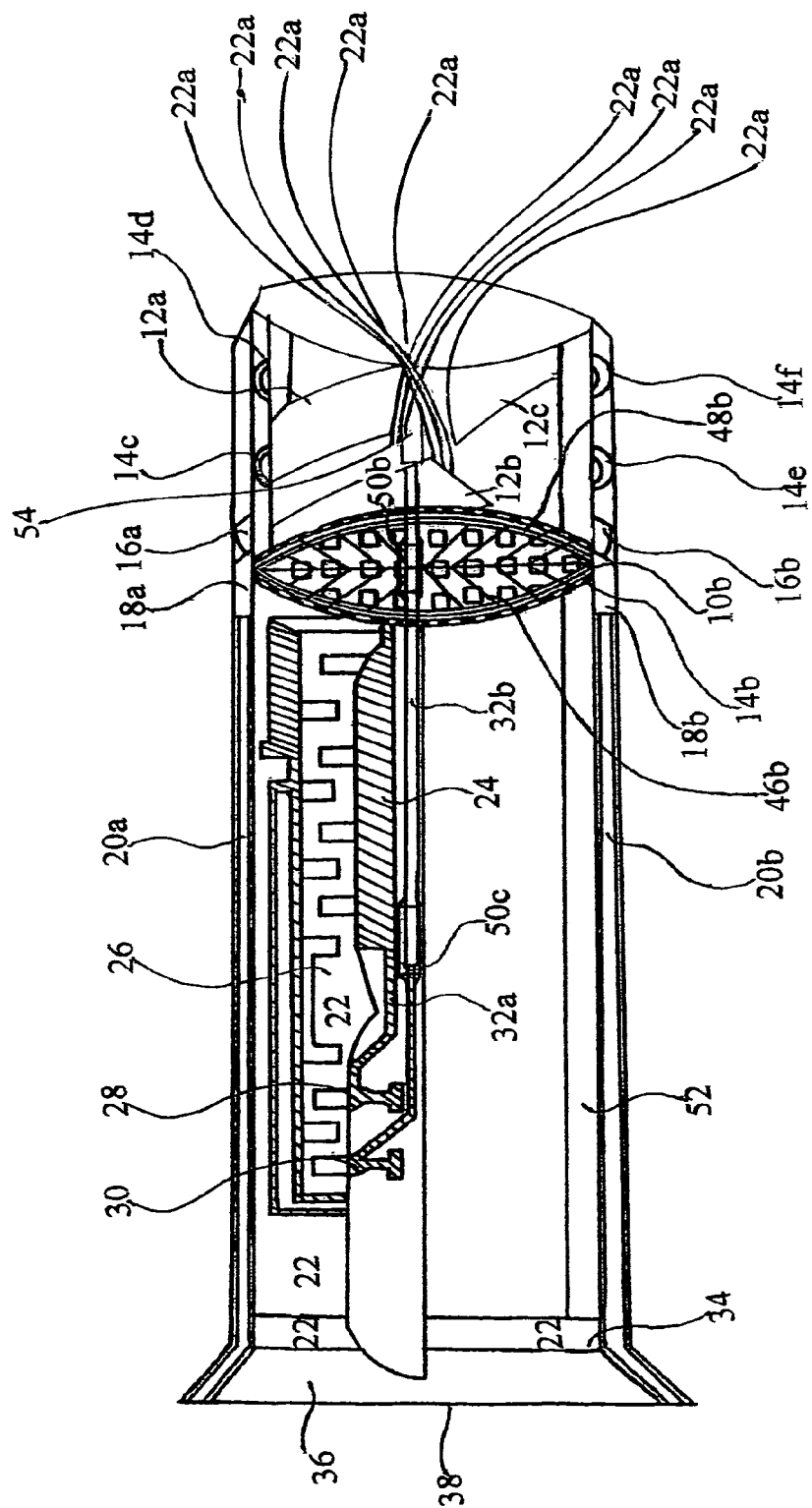
Figure 70:
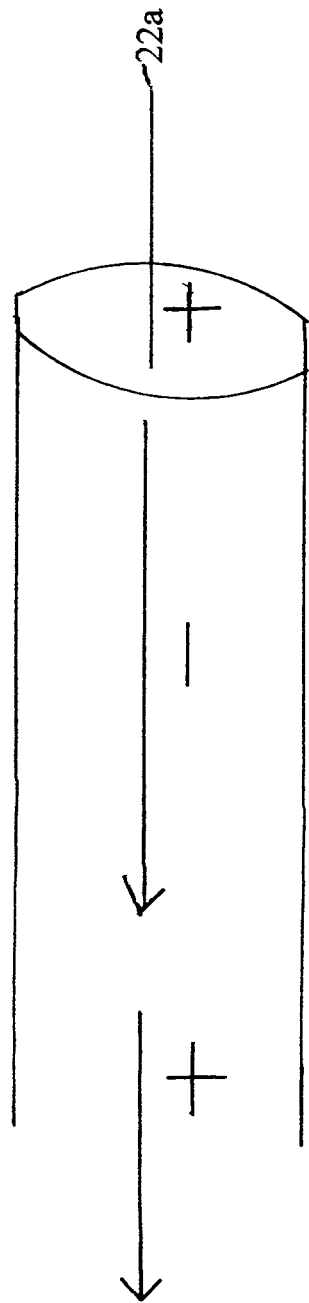

46a. is latitudinal, variance in degrees of aperture, for example;

46b. is latitudinal and longitudinal and variance in degrees of aperture, dense—for example;

46c. is longitudinal, variance in degrees of aperture, for example;

46d. is latitudinal and longitudinal variance in degrees of aperture, for example;

FIG. 47 the guard shown as conical/cone, with multiple longitudinal and latitudinal lines/vanes form (rectangular-convex nose of the guard);

FIG. 48 the guard shown as conical/cone, with multiple longitudinal and latitudinal lines/vanes form (convex nose of the guard with smaller scale of graduating metal/material or larger scale of metal/material);

FIG. 49 the guard, cap shown as conical/cone with solid form (convex nose guard);

FIG. 50 the guard, cap shown as conical/cone, with multiple slits in longitudinal lines/vanes form (convex nose guard);

FIG. 51 the guard, cap shown as conical/cone, with multiple longitudinal lines/vanes form (convex nose guard);

FIG. 52 the guard, cap shown as conical/cone, pierced triangular form—jagged with multiple in piercing (convex nose guard/grid can also be in other forms as well as geometric);

FIG. 53 the guard, cap shown as conical/cone, with multiple longitudinal lines/vanes form (convex nose guard with nose guard with cylindrical latitude form). FIG. 53 can also be formed with latitudinal lines/vanes without being cylindrical;

FIG. 54 the guard, cap shown as conical/cone, pierced triangular form jagged with multiple in piercing as well as longitudinal lines/vanes form, convex nose guard can also be in other forms latitudinal lines may also be added for gas/particle separation;

FIG. 55 the guard, cap shown as conical/cone, with multiple longitudinal lines/vanes form greater gas/particle separation with external centrifuge manifold particle collector-separator;

FIG. 56 the guard, cap shown as conical/cone, with multiple external vanes (vanes variance raised and/or lowered in degrees)—solid and/or partial form (for example);

FIG. 57 the rhombus structural support mechanism from with or without internal rotational systems, with or without treads/threads—for example, the rotational system is shown rectangular form this is one of many configurations and applications of the structural support mechanism frame;

FIG. 58 the parallelogram structural support mechanism from with or without internal rotational systems, with or without treads/threads—for example, the rotational system is shown rectangular form this is one of many configurations and applications of the structural support mechanism frame;

FIG. 59 the spherical/round structural support mechanism from with or without internal rotational systems, with or without treads/threads—for example, the rotational system is shown rectangular form this is one of many configurations and applications of the structural support mechanism frame;

FIG. 60 nose guard, cap shown as conical/cone form is solid formation (cone pointed);

FIG. 61 nose guard, cap shown as conical/cone form has multiple longitudinal and latitudinal lines/vanes form (cone pointed);

FIG. 62 nose guard, cap shown as conical/cone form is solid formation (convex form);

FIG. 63 nose guard, cap shown as conical/cone form has multiple longitudinal and latitudinal lines/vanes form (convex form);

FIG. 64 nose guard, cap shown as conical/cone form is solid formation (rectangular form);

FIG. 65 nose guard, cap shown as conical/cone form has multiple longitudinal and latitudinal lines/vanes form (rectangular form);

FIG. 66 nose guard, cap shown as conical/cone form is solid formation (concave form);

FIG. 67 nose guard, cap shown as conical/cone form has multiple longitudinal and latitudinal lines/vanes form (concave form);

FIG. 68 shows an isometric view of gaseous intake cavity with centrifuging process chamber formed and spatial vanes, manifold, with engine attached apparatus and/or pole, with rotational systems, exhibiting static free chamber, purification chamber;

FIG. 69 shows cross sectional view of gaseous intake cavity a guard, cap and/or screen without engine apparatus and/or pole, with rotational systems. Centrifuge chamber, manifold, particle separator-process with the exhibited within multi vanes, exhibiting entropic view;

FIG. 70 shows the process of reaction phase exhibiting forces, kinetic, electromagnetic, electrostatic, and thermodynamic of the gaseous intake cavity—for numerous craft, power plants and the like.

DETAILED DESCRIPTION

Figure 1:
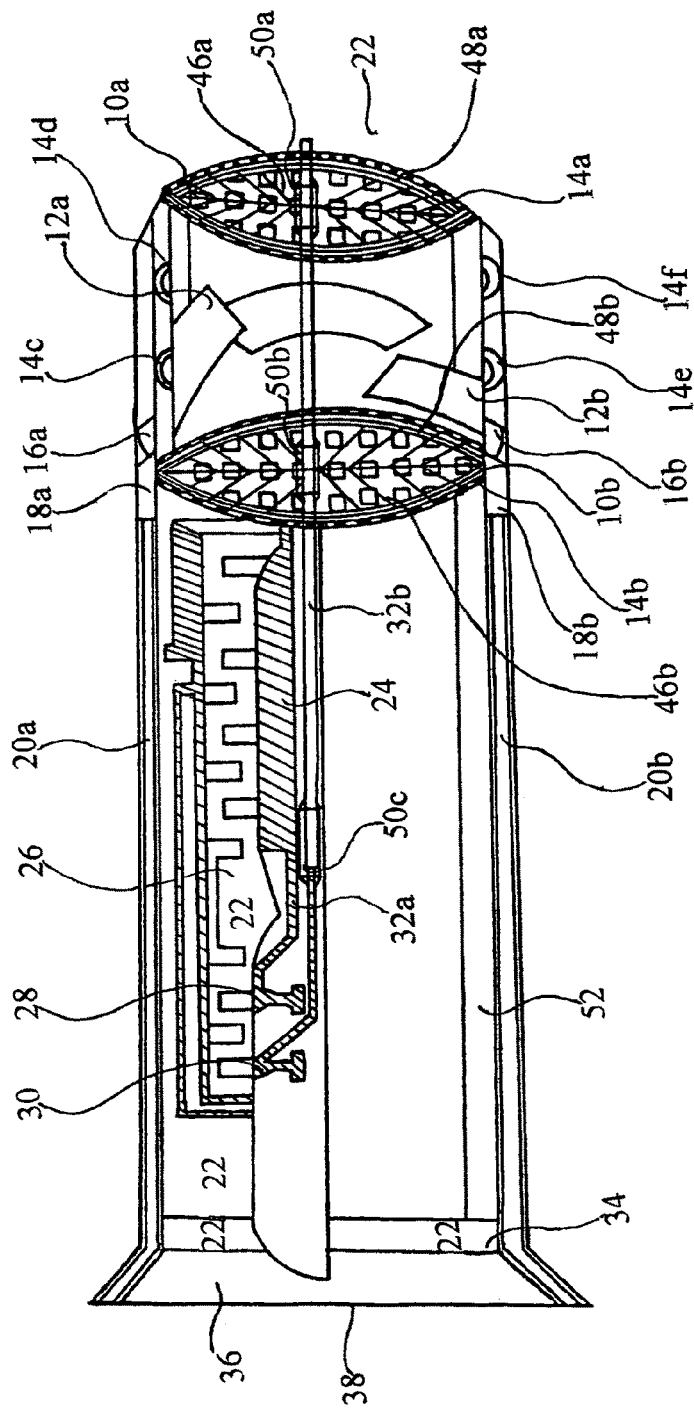
FIG. 1 shows an isometric view of double guards, caps and/or screens with engine attached apparatus and/or pole, with rotational system. Additional security by means of the centrifuge chamber/manifold particle separator with rotational system. Guard/cap and/or screen in the nacelle/air inlet according to the disclosed embodiment of the present invention.

FIG. 1 is the first embodiment exhibited in isometric partial view of apparatus and noted that the guard, caps and/or screens (can be interchanged) is shown with longitudinal and latitudinal form. This embodiment as well as other embodiment may consists of dispersing effect and/or retraction. In FIG. 1 numeral 10a and 10b we note the screen, can be fixed/secured, adhered, positioned and/or attached to the bases of the apparatus (can be separate apparatus), and thus fastened. The centrifuge chamber manifold particle collector exhibited by numerals 12a and 12b. The particle separator exhibits a pair of spaced walls the screens—for example—(pierced screen shown as FIG. 33 internal part can be of the meshed (2 or more wires)—guards, screen(s) with vane(s)—for example—shown as FIG. 46a thru 46d) with rotational system apparatus—exhibited by numeral 14a and 14b as well as 14c and 14d, with or without treads/threads—for example. Define as annular passageway there between, having at opposite ends thereof and outlet flow of communication through two ducts exhibited by numerals 16a and 16b located at opposite ends of the chamber. The vanes in the chamber exhibited by numeral 12a and 12b axially divide the chamber and define an annular extraction manifold. The three turning vanes (for example) each of which extends an arcuate distance of approximately 120 degrees, (for example) it can be seen that no particle need travel more than a circumferential distance of 120 degrees, (for example) before entering the extraction manifold from which rebound into the engine inlet is reduced. Variances in degrees can occur with structural configuration of guard(s), cap(s) and/or screen(s). Number of collector vanes may vary to meet the required amount for collector/separator efficiency. The ducts are in direct communication with the collection chambers exhibited by numerals 18a and 18b, and thus the collection chamber is in direct communication with the two conduits exhibited by numeral 20a and 20b. The chamber 18a, 18b may include mesh (2 or more wires—for example) for aerodynamic purposes in various forms as discussed herein.

As gaseous fluid, particles, and or air numeral 22, passes through the inlet which is at a high velocity by Force, Force Kinetic, it is turned or centrifuged circumferentially at such a downstream of the vanes, the air and or gaseous fluid has both angular and axial velocity. This is known as imparting "swirl" to the fluid stream. Small particles/gas and or matter (whether foreign or not) entrain in the air and or gaseous fluid's stream are also centrifuged, having small mass the gas/particles are carried along with the swirling air and or gaseous fluid. The particles/gas with the greater mass are not of our concern as such due to the guard(s)/grid(s), cap(s) and/or screen(s) are used for preventive measure. A particle/gas entrained in the air and or gaseous fluid's stream and centrifuged will have both tangential and axial velocity downstream of the turning vanes. Both tangential and axial velocity in theory not subjected to external forces travel in a straight line path to the outer periphery of the passageway. In practice, the swirling air and or gaseous fluid has significant effect on the particles/gas trajectory which can be compared roughly to that of a helix having increasing diameter in the downstream direction (as known). Thus the centrifuging and the entrainment through the turning vanes numerals 12a and 12b and into the extraction manifold from which particles/gas are collected through the ducts numerals 16a and 16b. The rotational systems on the chamber exhibited as numerals 14c and 14d shall additionally enable the centrifuging process to be enacted (with or without treads/threads—for example); as well as engine shaft attach—apparatus being major components.

The gaseous fluid, particles, and or air shown as numeral 22 entering the engine through the inlet passes through the compressor numeral 24 where it is compressed, and hence to the combustor numeral 26 where the gaseous fluid and or air is mixed with fuel and burned. The hot gases of combustion emerges at a high velocity from the combustor numeral 26 and passes sequentially through the high pressure turbine numeral 28 and low pressure turbine numeral 30 where gases are expanded to extract energy there from. Energy extracted from the hot gases by turbine numeral 28 provides driving force for the compressor numeral 24 which is connected to turbine 28 by shaft numeral 32a. Energy extracted from the hot gases by turbine numeral 30 is a form of means, provides the driving force for the main engine drive shaft numeral 32b which delivers power to an energy using device, such as helicopter rotor system (not exhibited). After exiting turbine numeral 30 the hot gases of combustion passes through the engine exhaust duct numeral 34 which includes diffuser numeral 36 in which case gases are expanded and exit the engine numeral 38. This is the formal function of numerous jet engines.

Ejector systems FIG. 6 numeral 40 includes control valve FIG. 6. Numeral 42 for controlling amount of gaseous fluid and or air bled from the compressor numeral 24 thus flow of the fluid through the conduits numerals 20a and 20b to increase efficiency of the gaseous engine thus being turbine and or other types of engines power plants and the like. When particle collector separation is not deemed necessary the ejector system may be used to interrupt the flow of the gaseous fluid and or air being bled. A modulating valve FIG. 6 numeral 44 regulates the flow in the conduit thereby increasing engine efficiency. The guards, caps and or screens as well as the rotational system shown in FIG. 1 numeral 10a and 10b as well as FIG. 31 thru FIG. 56 (of metal/material) can be fastened inside the air inlet of an aircraft and or the inlet of any craft, power plant and the like; as well as fastened to the nacelle exterior portion; and or air inlet of an aircraft and or the inlet of any craft extending outside the nacelle, similar processes applied to power plants and the like. This is also held true for FIG. 59 the spherical and/or round structural support frame, with or without rotational system and/or treads/threads shown as serrated (for example). The support frame can take numerous forms such as illustrated in FIG. 57 (rhombus) and FIG. 58 (parallelogram), for example. The guards, and/or screens can be fixed to the guards/grids and or guard/grid frame and/or as separate apparatus. Numeral 14a and 14b exhibits the rotational systems noted in rectangular form-this is one of the manipulations shown in FIG. 25. The rotational systems can be fixed to the guards cowls and/or base or as a separate apparatus (metal/material); thus the rotational systems 14a, 14b, 14c, and 14d can be fixed/secured, adhered and or attached to the nacelle/air inlet and thus any inlet or similar in nature for applicable to power plants and the like. All figures exhibited made of metal/material.

FIG. 1 numeral 46a and 46b (16 extension/rods in each guards, caps and or screen—for example)—can be separate apparatus—exhibits extension(s)/rod(s) which can be fixed/secured adhered, and/or attached to the guard, cap and/or screens; as well as can be fixed/secured, adhered, and/or attached to the engine shaft apparatus and/or pole. The extensions/rods numeral 46a and 46b can extend from the inward and or outward portion of the guards, caps and/or screens; or from the screens latitudinal vane(s) and fixed in the inward portion of the screen as exhibited (extensions/rods 46a and 46b can also be in multiples of 2/numerous in numbers and/or odd numbers-of metal/material, are fixed/secured, positioned and/or adhered to numeral 48a and 48b, which exhibits the treads/threads of the rotational systems allowing function to occur. Extensions/Rods can also take lacing configuration and/or longitudinal configuration as well as having a curved aperture (for example). Thus the treads/threads (for example) of the rotational systems production of various functions and movement allows gas separation to occur—examples of movement of function is swift, pivot, clockwise, (for example), time delayed, automated systems and/or hydraulics (for example—and/or for opening and closure of apparatus). For the appropriate function gas separation and or particle separation must occur. Numeral 32b exhibits the engine shaft extension(s) attachment and/or pole (of metal/material) thus adhered fixed/secured and/or attached to the guards, caps, screens and/or extensions. Numeral 32a exhibits shaft from the high pressure turbine. Numeral 50a,50b, and 50c the screen fixed/secured adhered, apparatus (metal/material) attached to the engine and to the engine shaft extension(s) and or pole-screens that allows apparatus to be secured/fixed. Therefore, allowing the continuous motion from the engine to occur without obstruction of further automation thereby inducing motion created by Force, Force Kinetic allowing the rotation and/or function for gas separation and or particle separation to occur without minimizing engine thrust—a higher performance engine has been created. Since particles may vary in size due to the guard(s)/grid(s), cap(s) and screen(s) in not allowing particles of significant matter to be ingested, particles may also remain in the collection chamber(s) which can be enclosed once particles enter from the duct(s) thereby offering and additional solution to this problem. The collection chamber 18a and 18b may include a mesh—(2 or more wires for example) as discussed above. This is a prime solution not only for numerous engines—various craft, jet turboprop, turboshaft, as well as for helicopters and other VTOL/VSTOL craft. This is a prime solution for engines, power plants and the like. The guard(s)/grid(s), cap(s) and/or screen(s) along with the mechanism is significant. A casing may be added as deemed fit shown as numeral 52.

The following apparatus are various manipulations of the rotational systems (FIG. 23 thru FIG. 45—rotational systems and or screens, guards, are of metal/material and can be in numerous forms—for example) can be separate apparatus and/or fixed/secured, adhered, and/or attached to the cowls and or base with or without treads/threads—as well as numerous methods can be used other than treads/threads (for example). Application of rotational system can be for various gas separation and or particle separation in various engines (for example compressor and combustion systems—for numerous engines, craft, power plants and the like. Variances in raised and or lowered in degrees of vanes, may also take a fly wheel composition FIG. 37 thru FIG. 43 allowing additional separation to occur and motion—whether turbine and or other systems as well as used in the guards, may also be used with conical/cones. The addition of a mesh (2 or more wiring systems) FIG. 46a thru 46d can be used in FIG. 23 thru FIG. 45 and in other mechanisms. Devices may also be stationary for other craft as mentioned, engines power plants and the like. All devices are independent and applied for numerous applications (and may also have curved aperture—for example) and thus interchanged on all apparatuses. Alternate guards, screens as discussed above and illustrated in FIG. 23-45 can also be incorporated into the embodiment illustrated in FIG. 3.

Figure 23:
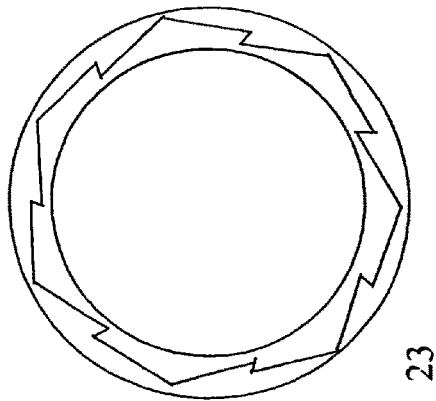
FIG. 23 rotational ring with serrated form (can also be inverted)

FIG. 23 rotational ring with serrated form (can also be inverted), shown to adhere to the cowls and/or base, with or without treads/threads.

Figure 24:
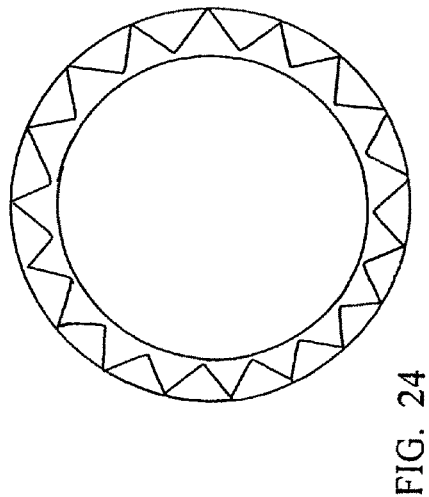
FIG. 24 rotational ring with jagged form (can also be inverted)

FIG. 24 rotational ring with jagged form (can also be inverted), shown to adhere to the cowls and/or base, with or without treads/threads.

Figure 25:
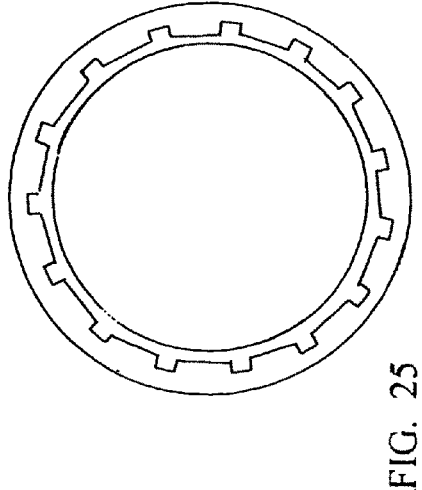
FIG. 25 rotational ring with rectangular form (can also be inverted)

FIG. 25 rotational ring with rectangular form (can also be inverted), shown to adhere to the cowls and/or base, with or without treads/threads.

Figure 26:
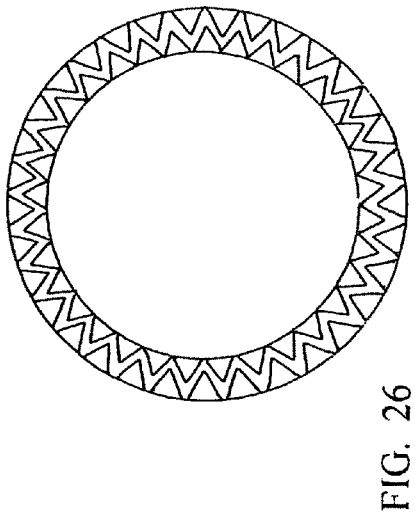
FIG. 26 rotational ring with jagged interlocked form (can also be inverted)

FIG. 26 rotational ring with jagged interlocked form (can also be inverted), shown to adhere to the cowls and/or base, with or without treads/threads.

FIG. 27 rotational ring with interlocked form (can also be inverted), shown to adhere to the cowls and/or base, with or without treads/threads.

FIG. 28 rotational ring as coiled form (can also be inverted without ring but may take ring formation or other forms—for example as well as numerous coils), shown to adhere to the cowls and/or base, with or without treads/threads.

FIG. 29 rotational ring as slotted form (can also be inverted on the outside as well as internal portion of the ring—for example as well as numerous slots), shown to adhere to the cowls and or base, with or without treads/threads.

FIG. 30 rotational ring as chain linked form (can also be inverted without ring but may take ring formation or other forms—for example as well as numerous links), shown to adhere to the cowls and/or base, with or without treads/threads.

Figure 31:
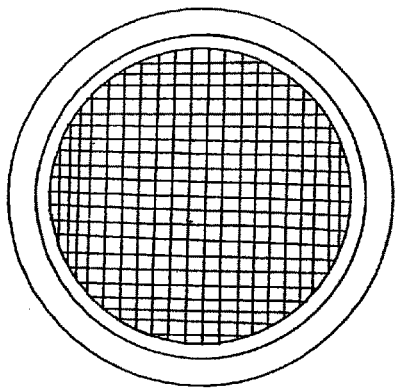
FIG. 31 rotational ring shown with screen—multiple in longitudinal and latitudinal lines/form (can also be without ring but in ring formation or other forms—for example)

FIG. 31 rotational ring shown with screen—multiple in longitudinal and latitudinal lines/form (can also be without ring but in ring formation or other forms—for example), shown to adhere to the cowls and/or base, with or without treads/threads.

Figure 32:
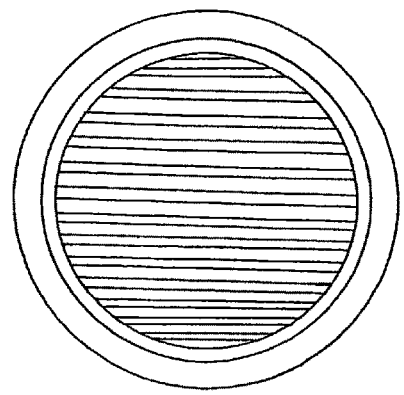
FIG. 32 rotational ring shown with screen—multiple in latitudinal lines/for (can also be without ring but in ring formation or other forms—for example)

FIG. 32 rotational ring shown with screen—multiple in latitudinal lines/for (can also be without ring but in ring formation or other forms—for example), shown to adhere to the cowls and/or base, with or without treads/threads.

Figure 33:
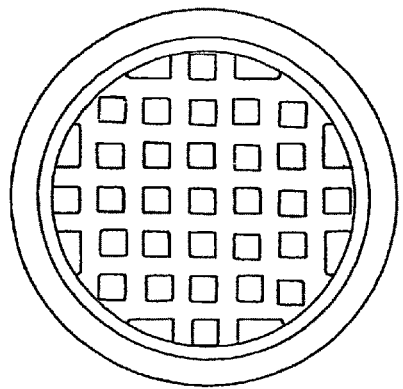
FIG. 33 rotational ring shown with screen-pierced form—multiple piercing (can also be without ring but in ring formation or other forms—for example—solid metal/material with pierced formation can also be in other forms as well as geometric—for example.

FIG. 33 rotational ring shown with screen-pierced form—multiple piercing (can also be without ring but in ring formation or other forms—for example—solid metal/material with pierced cube-exhibited with height, width, and depth formation, can also be in other forms geometric-forms for example), shown to adhere to the cowls and/or base, with or without treads/threads.

Figure 34:
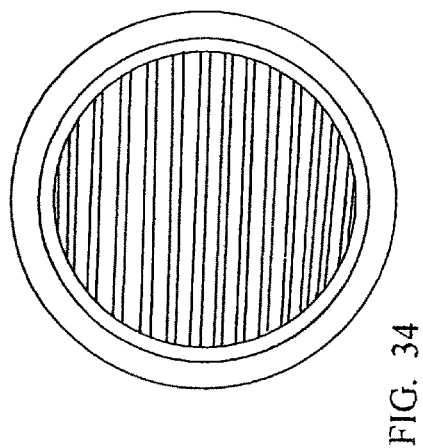
FIG. 34 rotational ring shown with screen—multiple in longitudinal lines/form (can also be without ring but in ring formation or other forms—for example)

FIG. 34 rotational ring shown with screen—multiple in longitudinal lines/form (can also be without ring but in ring formation or other forms—for example), shown to adhere to the cowls and/or base, with or without treads/threads.

Figure 35:
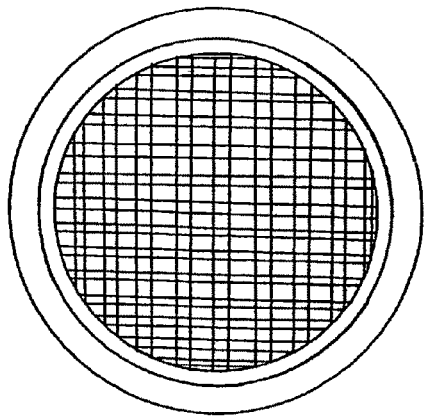
FIG. 35 rotational ring shown with screen—multiple in longitudinal and latitudinal lines/form (thicker/bolder form, can also be without ring but in ring formation or other forms—for example)

FIG. 35 rotational ring shown with screen—multiple in longitudinal and latitudinal lines/form (thicker/bolder form, can also be without ring but in ring formation or other forms—for example), shown to adhere to the cowls and/or base, with or without treads/threads.

Figure 36:
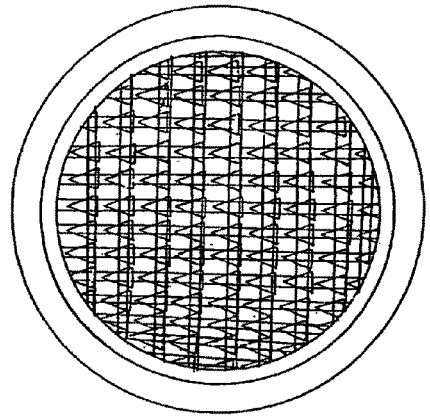
FIG. 36 rotational ring shown with screen—multiple in longitudinal and latitudinal lines/form—pierced—(can also be without ring but in ring formation or other forms—for example)

FIG. 36 rotational ring shown with screen—multiple in longitudinal and latitudinal lines/form—pierced—(can also be without ring but in ring formation or other forms—as well as geometric), shown to adhere to the cowls and/or base, with or without treads/threads.

Figure 37:
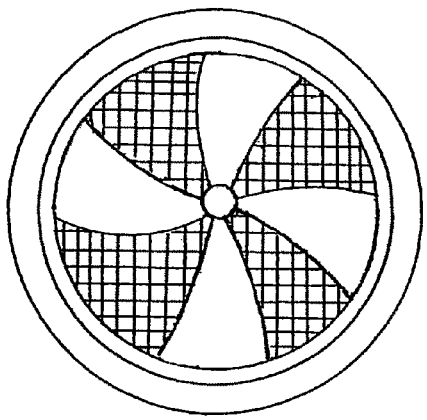
FIG. 37 rotational ring shown with screen multiple vanes (variance raised/lowered in degrees)—screen in longitudinal and latitudinal lines/form. Multiple vanes with screen, (multiples of 2 and or odd number of wires). Apparatus can also be without ring but in ring formation or other forms—for example)

FIG. 37 rotational ring shown with screen multiple vanes (variance raised/lowered in degrees)—screen in longitudinal and latitudinal lines/form. Multiple vanes with screen, (multiples of 2 and or odd number of wires). Apparatus can also be without ring but in ring formation or other.

Figure 38:
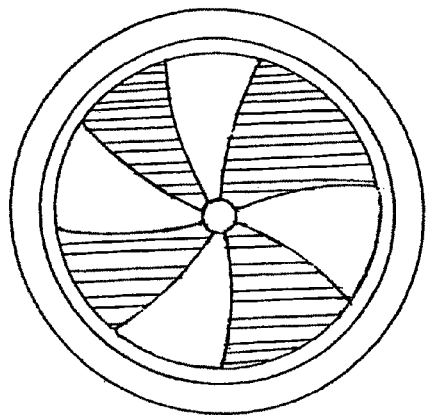
FIG. 38 rotational ring shown with screen multiple vanes (variance raised/lowered in degrees)—screen in latitudinal lines/form. Multiple vanes with screen, (multiples of 2 and or odd number of wires). Apparatus can also be without ring but in ring formation or other forms—for example)
Figure 40:
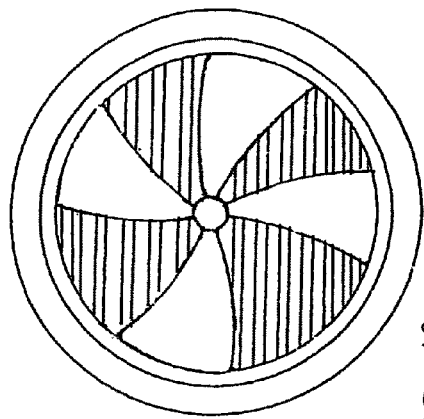
FIG. 40 rotational ring shown with screen multiple vanes (variance raised/lowered in degrees)—screen in longitudinal and latitudinal lines/form. Multiple vanes with screen, (multiples of 2 and or odd number of wires). Apparatus can also be without ring but in ring formation or other forms—for example)
Figure 42:
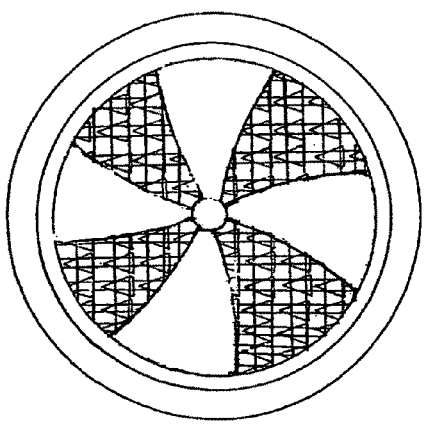
FIG. 42 rotational ring shown with screen multiple vanes (variance raised/lowered in degrees)—screen in longitudinal and latitudinal lines/form-pierced (can also be in other forms as well as geometric). Multiple vanes with screen, (multiples of 2 and or odd number of wires). Apparatus can also be without ring but in ring formation or other forms—for example)
Figure 39:
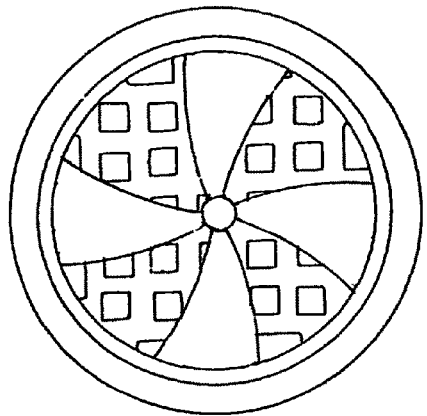
FIG. 39 rotational ring shown with screen-pierced form and multiple vanes (variance raised/lowered in degrees)—multiple cube piercing. Multiple vanes with screen, (multiples of 2 and or odd number of wires). Apparatus can also be without ring but in ring formation or other forms-for example (solid metal/material with pierced formation, can also be in other forms as well as geometric—for example), FIG. 46a thru FIG. 46d shown as the internal mesh for pierced mechanism; this mesh can also be used in other mechanisms and or manipulations.
Figure 41:
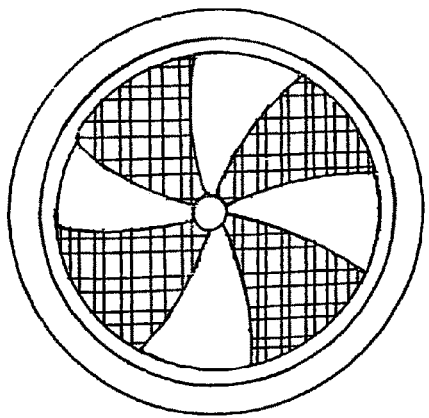
FIG. 41 rotational ring shown with screen multiple vanes (variance raised/lowered in degrees)—screen in longitudinal and latitudinal lines/form (thicker/bolder form). Multiple vanes with screen, (multiples of 2 and or odd number of wires). Apparatus can also be without ring but in ring formation or other forms—for example)
Figure 44:
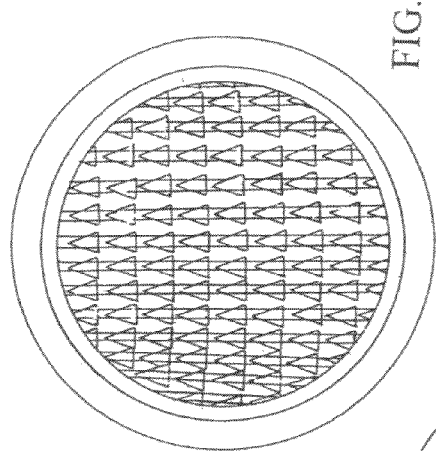
FIG. 44 rotational ring shown with screen—screen in longitudinal and latitudinal lines/form pierced triangular form (can be in other forms as well as geometric compositions)
Figures 46A, 46B, 46C, 46D:
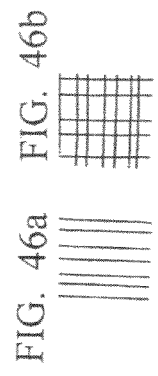
FIG. 46a-46d shown as internal mesh—wires for the pierced mechanism; this can also be used in numerous functions in accordance to the mechanism and/or guard.
Figure 45:
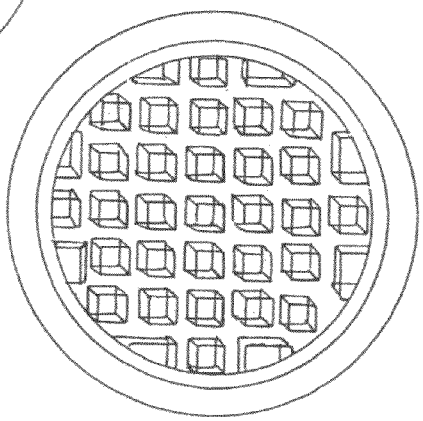
FIG. 45 rotational ring shown in cube form with height, width, and depth, multiple (can also be without ring with or without ring formation—other forms such as square for example). Solid metal/material with or without cubes and or cubes may consists of internal 2 or more wires odd numbers, side and/or bottom mesh—wires of 2 or more. Numerous geometric forms may take place with this guard.
Figure 43:
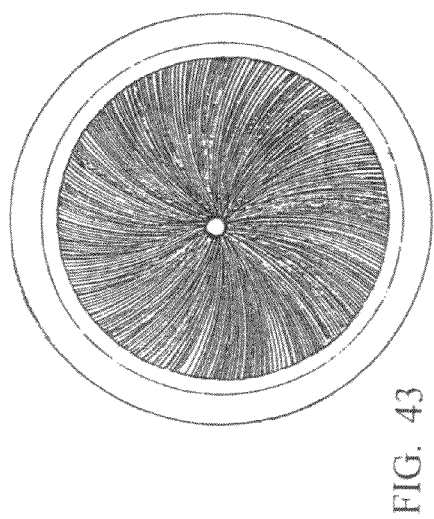
FIG. 43 rotational ring shown with screen—screen consists of multiple vanes (variance raised/lowered in degrees), with or without treads/threads—for example.

FIG. 38 rotational ring shown with screen multiple vanes (variance raised/lowered in degrees)—screen in latitudinal lines/form. Multiple vanes with screen, (multiples of 2 and or odd number of wires). Apparatus can also be without ring but in ring formation or other forms—for example);

FIG. 39 rotational ring shown with screen-pierced form and multiple vanes (variance raised/lowered in degrees)—multiple cube piercing. Multiple vanes with screen, (multiples of 2 and or odd number of wires). Apparatus can also be without ring but in ring formation or other forms—for example (solid metal/material with pierced formation, can also be in other forms as well as geometric—for example), FIG. 46*a* thru 46*d* shown as the internal mesh for pierced mechanism, the mesh can also be used in other mechanisms and or manipulations. FIG. 40 rotational ring shown with screen multiple vanes (variance raised/lowered in degrees)—screen in longitudinal and latitudinal lines/form. Multiple vanes with screen, (multiples of 2 and or odd number of wires). Apparatus can also be without ring but in ring formation or other forms—for example);

FIG. 41 rotational ring shown with screen multiple vanes (variance raised/lowered in degrees)—screen in longitudinal and latitudinal lines/form (thicker/bolder form). Multiple vanes with screen, (multiples of 2 and or odd number of wires). Apparatus can also be without ring but in ring formation or other forms—for example);

FIG. 42 rotational ring shown with screen multiple vanes (variance raised/lowered in degrees)—screen in longitudinal and latitudinal lines/form-pierced (can also be in other forms as well as geometric). Multiple vanes with screen, (multiples of 2 and or odd number of wires). Apparatus can also be without ring but in ring formation or other forms—for example);

FIG. 43 rotational ring shown with screen—screen consists of multiple vanes (variance raised/lowered in degrees), with or without treads/threads—for example;

FIG. 44 rotational ring shown with screen—screen in longitudinal and latitudinal lines/form pierced triangular form (can be in other forms as well as geometric compositions);

FIG. 45 rotational ring shown in cube form with height, width, and depth, multiple (can also be without ring with or without ring formation—other forms such as square for example). Solid metal/material with or without cubes and or cubes may consists of internal 2 or more wires odd numbers, side and/or bottom mesh—wires of 2 or more. Numerous geometric forms may take place with this guard;

FIG. 46*a*-46*d* shown as internal mesh—wires for the pierced mechanism; this can also be used in numerous functions in accordance to the mechanism and/or guard/grid;

FIGS. 46*a*, 46*b*, 46*c*, and 46*d* consists of variance in meshing—wire mesh:
  46*a*. is latitudinal, variance in degrees of aperture, for example;
  46*b*. is latitudinal and longitudinal and variance in degrees of aperture, dense—for example;
  46*c*. is longitudinal, variance in degrees of aperture, for example;
  46*d*. is latitudinal and longitudinal variance in degrees of aperture, for example;

The following apparatus are various manipulations of the guards, caps with conical/cones (apparatus can be independent of each other), shown with cowls and/or base can be fixed/secured, adhered, and/or attached; thus by being fixed/secured, adhered, and/or attached to the rotational ring and or frames for multiple functions (apparatus can be separate) of FIG. 1 numerals 14*a* and 14*b* with or without treads/threads. Extensions/Rods FIG. 1 numerals 46*a* and 46*b* (apparatus can be independent and may have a curved aperture), can be fixed/secured, adhered, positioned and/or attached to guards, caps and/or screens; as well as engine shaft extension attachment and/or pole, and/or rotational systems apparatus. All guards, caps, Noses can be convex/concave, pointed and or solid (for example) as well as other manipulations listed (apparatus independently and/or whole can be of metal/material):

FIG. 47 the guard shown as conical/cone, with multiple longitudinal and latitudinal lines/vanes form (rectangular-convex nose of the guard), shown to adhere to the cowls and/or base, as well as adhering to the rotational rings numerals 14*a* and 14*b* with or without treads/threads; thus can be applied to FIG. 23 thru FIGS. 45, 57, 58, and 59 respectively;

FIG. 48 the guard shown as conical/cone, with multiple longitudinal and latitudinal lines/vanes form (convex nose of the guard with smaller scale of graduating metal/material or larger scale of metal/material—the nose of the guard/grid, cap can be interchanged with other manipulations), shown to adhere to the cowls and/or base, as well as adhering to the rotational rings numerals 14*a* and 14*b* with or without treads/threads; thus can be applied to FIG. 23 thru FIGS. 45, 57, 58, and 59 respectively;

FIG. 49 the guard, cap shown as conical/cone with solid form (convex nose guard), shown to adhere to the cowls and/or base, as well as adhering to the rotational rings numerals 14*a* and 14*b* with or without treads/threads; thus can be applied to FIG. 23 thru FIGS. 45, 57, 58, and 59 respectively;

FIG. 50 the guard, cap shown as conical/cone, with multiple slits in longitudinal lines/vanes form (convex nose guards), shown to adhere to the cowls and/or base, as well as adhering to the rotational rings numerals 14*a* and 14*b* with or without treads/threads; thus can be applied to FIG. 23 thru FIGS. 45, 57, 58, and 59 respectively;

FIG. 51 the guard, cap shown as conical/cone, with multiple longitudinal lines/vanes form (convex nose guard), shown to adhere to the cowls and/or base, as well as adhering to the rotational rings numerals 14*a* and 14*b* with or without treads/threads; thus can be applied to FIG. 23 thru FIGS. 45, 57, 58, and 59 respectively;

FIG. 52 the guard, cap shown as conical/cone, pierced triangular form or jagged—with multiple in triangular for or jagged piercings (convex nose guard can also be in other forms as well as geometric), shown to adhere to the cowls and/or base, as well as adhering to the rotational rings numerals 14*a* and 14*b* with or without treads/threads; thus can be applied to FIG. 23 thru FIGS. 45, 57, 58, and 59 respectively;

FIG. 53 the guard, cap shown as conical/cone, with multiple longitudinal lines/vanes form (convex nose guard with nose guard with cylindrical latitude form). FIG. 53 can also be formed with latitudinal lines/vanes without being cylindrical, shown to adhere to the cowls and/or base, as well as adhering to the rotational rings numerals 14*a* and 14*b* with or without treads/threads; thus can be applied to FIG. 23 thru FIGS. 45, 57, 58, and 59 respectively;

FIG. 54 the guard, cap shown as conical/cone, pierced triangular form—jagged with multiple in piercing as well as longitudinal lines/vanes form (convex nose guard can also be in other forms—latitudinal lines may also be added for additional obstruction and or gas/particle separation, shown to adhere to the cowls and/or base, as well as adhering to the rotational rings numerals 14*a* and 14*b* with or without treads/threads; thus can be applied to FIG. 23 thru FIGS. 45, 57, 58, and 59 respectively;

FIG. 55 the guard, cap shown as conical/cone, with multiple longitudinal lines/vanes (convex nose guard) form greater gas/particle separation with external centrifuge manifold particle collector-separator thus offering centrifuging process by turning vanes each extending an arcuate distance of approximately 120 degrees, (for example), shown to adhere to the cowls and/or base, as well as adhering to the rotational rings numerals 14*a* and 14*b* with or without treads/threads; thus can be applied to FIG. 23 thru FIGS. 45, 57, 58, and 59 respectively;

FIG. 56 the guard, cap shown as conical/cone, with multiple external vanes (vanes variance raised and/or lowered in degrees)—solid and/or partial form—convex nose guard (for example). Exterior of a series of turning vanes each extending an accurate distance of approximately 120 degrees—for example (degrees may vary depending on how many vanes are added to the conical/cone), shown to adhere to the cowls and/or base, as well as adhering to the rotational rings numerals 14*a* and 14*b* with or without treads/threads; thus can be applied to FIG. 23 thru FIGS. 45, 57, 58, and 59 respectively. This conical/cone is prime for deflecting shrapnel and thus returning shrapnel to the enemy without causing obstruction to the engine components and yet offer maximization of gas and or particle separation. Note: conical/cone may also take latitudinal lines/vanes—not exhibited.

The following device is the "Structural Support Mechanism/Frame System," for numerous craft, jets, turboprops, turboshaft, and other VTOL/VSTOL as well as engines power plants and the like—applications of this mechanism may also be for the combustor and or compressor for appropriate gas separation and or particle separation; with or without rotational system as well as with or without treads/threads (for example). Rotational system may be within structural support mechanism and or prior to the structural support mechanism and/or henceforth thereafter. Possible inclusion of guards, caps, and/or screens with this structural support mechanism.

FIG. 57 the rhombus structural support mechanism/form with or without internal rotational systems, with or without treads/threads—for example, the rotational system is shown rhombus—rectangular form as shown as FIG. 25 can be fixed/secured, adhered, attached inside inlet of a craft, as well as fastened to the nacelle exterior portion, and/or in the inlet extending outside the nacelle (metal/material). This is one of many configurations and applications of the structural support mechanism;

FIG. 58 the parallelogram structural support mechanism/form with or without internal rotational systems, with or without treads/threads—for example, the rotational system is shown rectangular form as FIG. 25 can be fixed/secured, adhered, attached inside inlet of a craft, as well as fastened to the nacelle exterior portion, and/or in the inlet extending outside the nacelle (metal/material). This is one of many configurations and applications of the structural support mechanism;

FIG. 59 the spherical/round structural support mechanism/form with or without internal rotational systems, with or without treads/threads—for example, the rotational system is shown rectangular form as FIG. 25 can be fixed/secured, adhered, attached inside inlet of a craft, as well as fastened to the nacelle exterior portion, and/or in the inlet extending outside the nacelle (metal/material). This is one of many configurations and applications of the structural support mechanism;

The following apparatus are nose guards, caps shown in conical/cone form with various interchanging nose guards, caps—may take the configuration of convex, concave and or solid—for example. All nose guards/grids are independent and thus interchangeable on all conical/cones. The following manipulations of the conical/cones, nose/guards, caps:

FIG. 60 nose guard, cap shown as conical/cone form is solid formation (cone pointed); such a nose guard, cap can be solid in whole and or partial and in kind.

FIG. 61 nose guard, cap shown as conical/cone form has multiple longitudinal and latitudinal lines/vanes form (cone pointed); such a nose guard, cap can be solid in whole and or partial and in kind.

FIG. 62 nose guard, cap shown as conical/cone form is solid formation (convex form); such a nose guard/grid, cap can be solid in whole and or partial and in kind.

FIG. 63 nose guard, cap shown as conical/cone form has multiple longitudinal and latitudinal lines/vanes form (convex form); such a nose guard, cap can be solid in whole and or partial and in kind.

FIG. 64 nose guard, cap shown as conical/cone form is solid formation (rectangular form) such a nose guard/grid, cap can be solid in whole and or partial and in kind.

FIG. 65 nose guard, cap shown as conical/cone form has multiple longitudinal and latitudinal lines/vanes form (rectangular form); such a nose guard, cap can be solid in whole and or partial and in kind.

FIG. 66 nose guard, cap shown as conical/cone form is solid formation (concave form); such a nose guard, cap can be solid in whole and or partial and in kind.

FIG. 67 nose guard, cap shown as conical/cone form has multiple longitudinal and latitudinal lines/vanes form (concave form); such a nose guard, cap can be solid in whole and or partial and in kind.

Figure 2:
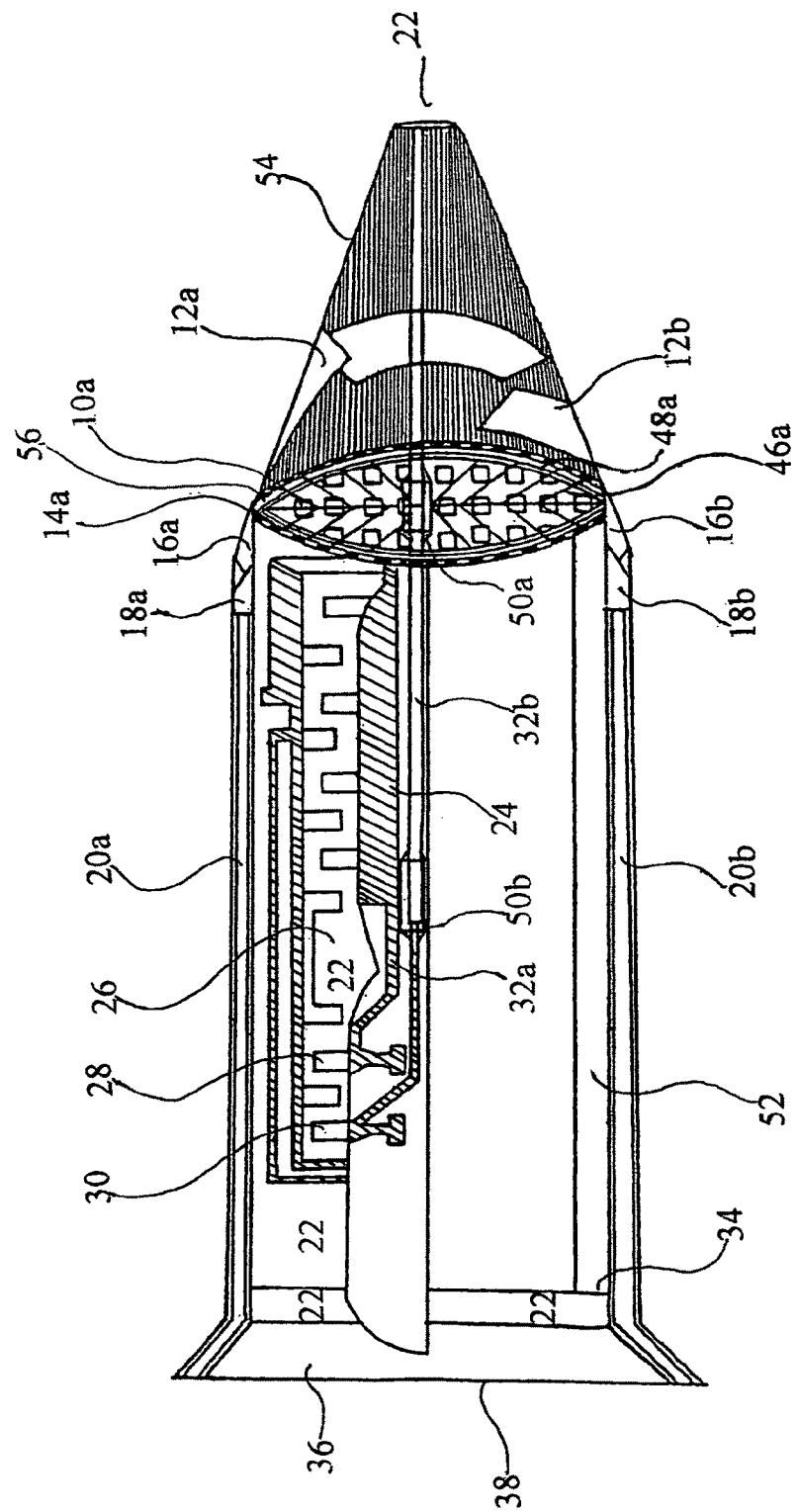
FIG. 2 shows an isometric view of double guards, caps and/or screens with engine attached apparatus and/or pole, with rotational systems. Centrifuge chamber/manifold particle separator with the exhibited within multi vane conical.

FIG. 2 is an alternative embodiment exhibited in a isometric partial view of apparatus and noted that the guard, caps and/or screens (can be interchanged) is shown with longitudinal and latitudinal form. This embodiment as well as other embodiment may consists of dispersing effect and/or retraction. In FIG. 2 numeral 10*a* and 10*b* we note the screen, can be fixed/secured, adhered, positioned and/or attached to the bases of the apparatus (can be separate apparatus), and thus fastened. The centrifuge, chamber, manifold, and process thereof, particle collector exhibited by numerals 12*a* and 12*b*. The particle separator exhibits a pair of spaced walls—within the conical/cone—for example—(pierced screen shown as FIG. 33 internal part can be of the meshed (2 or more wires)—guards, screen(s) with vane(s)—for example—shown as FIG. 46*a* thru 46*d*) with rotational system apparatus—exhibited by numeral 14*a* with or without treads/threads—for example. Define as annular passageway there between, having at opposite ends thereof and outlet flow of communication through two ducts exhibited by numerals 16*a* and 16*b* located at opposite ends of the chamber. The vanes in the chamber exhibited by numeral 12*a* and 12*b* axially divide the chamber and define an annular extraction manifold. The three turning vanes (for example) each of which extends an arcuate distance of approximately 120 degrees, (for example) it can be seen that no particle need travel more than a circumferential distance of 120 degrees, (for example) before entering the extraction manifold from which rebound into the engine inlet is reduced. Variances in degrees can occur with structural configuration of guard(s), cap(s) and/or screen(s). Number of collector vanes may vary to meet the required amount for collector/separator efficiency. The ducts are in direct communication with the collection chambers exhibited by numerals 18*a* and 18*b*, and thus the collection chamber is in direct communication with the two conduits exhibited by numeral 20*a* and 20*b*. The chamber 18*a*, 18*b* may include mesh (2 or more wires—for example) for aerodynamic purposes in various forms as discussed herein. As gaseous fluid, particles, and or air numeral 22, passes through the inlet which is at a high velocity by Force, Force Kinetic, it is turned or centrifuged circumferentially at such a downstream of the vanes, the air and or gaseous fluid has both angular and axial velocity. This is known as imparting "swirl" to the fluid stream. Small particles/gas and or matter (whether foreign or not) entrain in the air and or gaseous fluid's stream are also centrifuged, having small mass the gas/particles are carried along with the swirling air and or gaseous fluid. The particles/gas with the greater mass are not of our concern as such due to the guard(s), cap(s) and/or screen(s) are used for preventive measure. A particle/gas entrained in the air and or gaseous fluid's stream and centrifuged will have both tangential and axial velocity downstream of the turning vanes. Both tangential and axial velocity in theory not subjected to external forces travel in a straight line path to the outer periphery of the passageway. In practice, the swirling air and or gaseous fluid has significant effect on the particles/gas trajectory which can be compared roughly to that of a helix having increasing diameter in the downstream direction (as known). Thus the centrifuging and the entrainment through the turning vanes numerals 12*a* and 12*b* and into the extraction manifold from which particles/gas are collected through the ducts numerals 16*a* and 16*b*. The engine shaft attached apparatus numeral 32*b* is thus being the component in allowing auto induced function for the rotational and centrifuge process to occur within the conical/cone. The gaseous fluid, particles, and or air shown as numeral 22 entering the engine through the inlet passes through the compressor numeral 24 where it is compressed, and hence to the combustor numeral 26 where the gaseous fluid and or air is mixed with fuel and burned. The hot gases of combustion emerges at a high velocity from the combustor numeral 26 and passes sequentially through the high pressure turbine numeral 28 and low pressure turbine numeral 30 where gases are expanded to extract energy there from. Energy extracted from the hot gases by turbine numeral 28 provides driving force for the compressor numeral 24 which is connected to turbine 28 by shaft numeral 32*a*. Energy extracted from the hot gases by turbine numeral 30 is a form of means, provides the driving force for the main engine drive shaft numeral 32*b* which delivers power to an energy using device, such as helicopter rotor system (not exhibited). After exiting turbine numeral 30 the hot gases of combustion passes through the engine exhaust duct numeral 34 which includes diffuser numeral 36 in which case gases are expanded and exit the engine numeral 38. This is the formal function of numerous jet engines. Ejector systems FIG. 6 numeral 40 includes control valve FIG. 6. Numeral 42 for controlling amount of gaseous fluid, particles, and or air bled from the compressor numeral 24 thus flow of the fluid through the conduits numerals 20*a* and 20*b* to increase efficiency of the gaseous engine thus being turbine and or other types of engines power plants and the like. Particle collector separation is not deemed necessary the ejector system may be used to interrupt the flow of the gaseous fluid, particles, and or air being bled. A modulating valve FIG. 6 numeral 44 regulates the flow in the conduit thereby increasing engine efficiency. The guards, caps and or screens as well as the rotational system shown in FIG. 2 numeral 10*a* and 10*b* as well as FIG. 31 thru FIG. 56(*of* metal/material) can be fastened inside the air inlet of an aircraft and or the inlet of any craft, power plant and the like; as well as fastened to the nacelle exterior portion; and or air inlet of an aircraft and or the inlet of any craft extending outside the nacelle, similar processes applied to power plants and the like. This is also held true for FIG. 59 the spherical and/or round structural support mechanism/frame, with or without rotational system and/or treads/threads shown as serrated (for example). The support mechanism/frame can take numerous forms such as illustrated in FIG. 57 (rhombus) and FIG. 58 (parallelogram), for example. The guards, and/or screens can be fixed to the guards and or guard/grid frame and/or as separate apparatus. Numeral 14*a* and 14*b* exhibits the rotational systems noted in rectangular form-this is one of the manipulations shown in FIG. 25. The rotational systems can be fixed to the guards cowls and/or base or as a separate apparatus (metal/material); thus the rotational systems 14*a* can be fixed/secured, adhered and or attached to the nacelle/air inlet and thus any inlet or similar in nature for applicable to power plants and the like. All figures exhibited made of metal/material. FIG. 2 numeral 46a (16 extension/rods in each guards, caps and or screen—for example)—can be separate apparatus—exhibits extensions)/rod(s) which can be fixed/secured adhered, and/or attached to the guard, cap and/or screens; as well as can be fixed/secured, adhered, and/or attached to the engine shaft apparatus and/or pole. The extensions/rods numeral 46a and 46b can extend from the inward and or outward portion of the guards, caps and/or screens; or from the screens latitudinal vane(s) and fixed in the inward portion of the screen as exhibited (extensions/rods 46a and 46b can also be in multiples of 2/numerous in numbers and/or odd numbers—of metal/material, are fixed/secured, positioned and/or adhered to numeral 48a which exhibits the treads/threads of the rotational systems allowing function to occur. Extensions/Rods can also take lacing configuration and/or longitudinal configuration as well as having a curved aperture (for example). Thus the treads/threads (for example) of the rotational systems production of various functions and movement allows gas/particle separation to occur—examples of movement of function is swift, pivot, clockwise, (for example), time delayed, automated systems and/or hydraulics (for example—and/or for opening and closure of apparatus). For the appropriate function gas separation and or particle separation must occur. Numeral 32b exhibits the engine shaft extension(s) attachment and/or pole (of metal/material) thus adhered fixed/secured and/or attached to the guards/grids, caps, screens and/or extensions. Numeral 32a exhibits shaft from the high pressure turbine. Numeral 50a the screen fixed/secured adhered, apparatus (metal/material) attached to the engine and to the engine shaft extension(s) and or pole-screens that allows apparatus to be secured/fixed. Therefore, allowing the continuous motion from the engine to occur without obstruction of further automation thereby inducing motion created by Force, Force Kinetic allowing the rotation and/or function for gas separation and or particle separation to occur without minimizing engine thrust—a higher performance engine has been created. Since particles may vary in size due to the guard(s), cap(s) and screen(s) in not allowing particles of significant matter to be ingested, particles may also remain in the collection chamber(s) which can be enclosed once particles enter from the duct(s) thereby offering and additional solution to this problem. The collection chamber 18a and 18b may include a mesh (2 or more wires) as discussed. This is a prime solution not only for numerous engines—various craft, jet turboprop, turboshaft, as well as for helicopters and other VTOL/VSTOL craft. This is a prime solution for engines, power plants and the like. The guard(s), cap(s) and/or screen(s) along with the mechanism is significant. A casing may be added as deemed fit shown as numeral 52. Alternate guards/grids, screens as illustrated in FIG. 23-45 can also be incorporated into the embodiment illustrated in FIG. 2.

FIG. 3 shows an isometric FIG. 3 shows partial expanded view of a multi vane double guards, caps and or screens with engine attached apparatus and/or pole, with rotational systems. Centrifuge, chamber, manifold particle collector-separator with shown with expanded view as well as multiple extensions/rods 46a—18 for example, (exhibited in the inward position towards the security apparatus), exhibited in FIG. 2.

FIG. 4 shows an isometric partial expanded view of a multi vane double guards, caps, and/or screens with engine attached apparatus and/or pole, with rotational systems. Centrifuge chamber manifold particle collector-separator with shown expanded as well as multiple extensions/rods 46c—18 for example, (exhibited in the outward position of the security apparatus);

FIG. 5 shows a cross-sectional view of separator exhibited in FIG. 1 numerals 12a and 12b as well as exhibited in FIG. 2 numerals 12a and 12b. Thus the separator-three tuning vanes each of which extends an accurate distance of approximately 120 degrees, (for example) it can be seen that no gas and or particle need travel more than circumferential distance of 120 degrees (for example) before entering the extraction manifold from which rebound into the engine inlets reduced. Variances in degrees can occur with structural configuration of guard(s), cap(s), and/or screen(s) we note the separators turning vanes in FIG. 1 and FIG. 2 are exhibited on the conical/cone (for example).

FIG. 6 shows additional ejector system numeral 40 includes the control valve numeral 42 for controlling the amount of gas, particle, and or air bled from the compressor FIG. 1 and FIG. 2 numeral 24 thus flow of the fluid through the conduits FIG. 1 and FIG. 2 numerals 20a and 20b to increase efficiency of engine. When particle collector separation is not deemed necessary the ejector system may be used to interrupt the flow of bled gas and or air. A modulating valve exhibited in FIG. 6 numeral 44 regulates the flow in the conduit thereby increasing engine efficiency.

FIG. 7 shows the manifold sectional, engine attached apparatus and/or pole-(apparatus can be single, or attached, fixed/secured on the engine attached apparatus and/or pole, or fixed secured on the guard(s), cap(s) and/or screen(s). The manifold may also include a type of mesh—two or more wires to further allow gas separation and or particle separation to take place.

Figure 8:
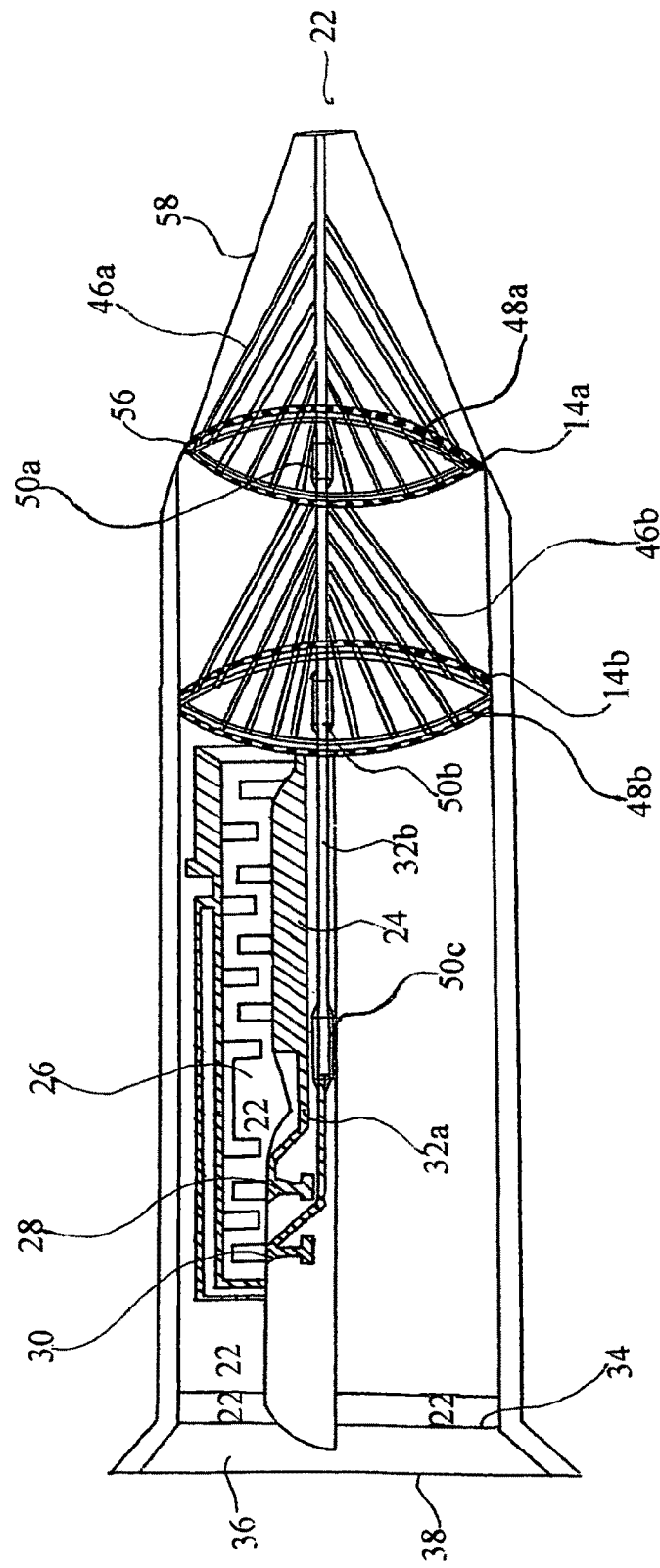
FIG. 8 shows isometric partial view of the double guards, caps and/or screens with engine attached apparatus and/or pole, with rotational systems.

FIG. 8 illustrates another alternative embodiment of single/multiple guard(s), cap(s) and/or screen(s) with engine attached apparatus and/or pole with rotational system(s); exhibited in a isometric partial view of apparatus and noted that the guards/grids, caps and or screens (can be interchanged) is shown with longitudinal and latitudinal form. In FIG. 8 numeral 58 exhibits conical/cone with convex nose guard (conical/cones may be suited for example are FIG. 47 thru FIG. 56 as well as FIG. 10 numeral 60 the darted conical/cone) exhibiting cowl and/or base as numeral 56 thereby attached to the rotational system(s) noted in rectangular form exhibited as numerals 14a and 14b—this is one of the manipulations shown in FIG. 25 The rotational system(s) can be fixed to the guards of the cowl and/or base or as a separate apparatus (of metal/material); thus the rotational system(s) 14a and 14b can be fixed/secured, adhered and/or attached to the nacelle and or inlet. FIG. 8 numerals 46a and 46b (exhibits extensions/rods—46a 10 extensions/rods, 46b 12 extensions for example) can be separate apparatus-exhibits extension(s)/rod(s) which can be fixed/secured, adhered, and/or attached to the guard, caps, and/or screens; as well as fixed/secured, adhered, and/or attached to the engine shaft extension(s) and or pole apparatus. These extensions)/rod(s) numerals 46a and 46b can extend inward and/or outward portion of the guard(s)/grid(s), cap(s), and/or screen(s); or form the screen latitudinal vane(s)—(if screen is added) fixed/secured, attached, and/or adhered to the inward portion of the guard(s)/grid(s), cap(s), and/or screens. Extensions/Rods 46a and 46b can also be in multiples of 2/numerous and or odd numbers, extensions/rods may have a curved aperture for greater gas and or particle separation (of metal/material). Conical/cones with multi vanes have a greater degree of gas and or particle separation thereby engine to function more efficiency.

As gaseous fluid, particles, and or air numeral 22, passes through the inlet which is at a high velocity by Force, Force Kinetic, it is turned or centrifuged circumferentially at such a downstream of the vanes, the gaseous fluid, particles, and or air has both angular and axial velocity. This is known as imparting "swirl" to the fluid stream. Small particles/gas and or matter (whether foreign or not) entrain in the air and or gaseous fluid's stream are also centrifuged, having small mass the gas/particles are carried along with the swirling air and or gaseous fluid. The particles/gas with the greater mass are not of our concern as such due to the guard(s), cap(s) and/or screen(s) are used for preventive measure. A particle/gas entrained in the air and or gaseous fluid's stream and centrifuged will have both tangential and axial velocity downstream of the turning vanes. Both tangential and axial velocity in theory not subjected to external forces travel in a straight line path to the outer periphery of the passageway. In practice, the swirling air and or gaseous fluid has significant effect on the particles/gas trajectory which can be compared roughly to that of a helix having increasing diameter in the downstream direction (as known). The rotational systems numerals 14a and 14b with or without treads/threads numerals 48a and 48b shall enable gas and or particle separation to take place as well as guard from foreign objects and or matter of significant mass. The gaseous fluid and or air shown as numeral 22 entering the engine through the inlet passes through the compressor numeral 24 where it is compressed, and hence to the combustor numeral 26 where the gaseous fluid and or air is mixed with fuel and burned. The hot gases of combustion emerges at a high velocity from the combustor numeral 26 and passes sequentially through the high pressure turbine numeral 28 and low pressure turbine numeral 30 where gases are expanded to extract energy there from. Energy extracted from the hot gases by turbine numeral 28 provides driving force for the compressor numeral 24 which is connected to turbine 28 by shaft numeral 32a. Energy extracted from the hot gases by turbine numeral 30 is a form of means, provides the driving force for the main engine drive shaft numeral 32b which delivers power to an energy using device, such as helicopter rotor system (not exhibited). After exiting turbine numeral 30 the hot gases of combustion passes through the engine exhaust duct numeral 34 which includes diffuser numeral 36 in which case gases are expanded and exit the engine numeral 38. This is the formal function of numerous jet engines. Ejector systems as well as conduits may also be added (not exhibited) in FIG. 8 but exhibited in FIG. 1 and FIG. 2, FIG. 6 numeral 40 includes control valve FIG. 6. Numeral 42 for controlling amount of gaseous fluid and or air bled from the compressor numeral 24 thus flow of the fluid through the conduits numerals 20a and 20b to increase efficiency of the gaseous engine thus may be turbine and or other types of engines power plants and the like. A modulating valve FIG. 6 numeral 44 regulates the flow in the conduit thereby increasing engine efficiency. The guards, caps and or screens as well as the rotational system 14a and 14b shown in FIG. 8 numeral 58 are also deemed appropriate use possible to be used in FIG. 31 thru FIG. 56 (of metal/material) can be fastened inside the air inlet of an aircraft and or the inlet of any craft, power plant and the like; as well as fastened to the nacelle exterior portion, and or air inlet of an aircraft and or the inlet of any craft extending outside the nacelle, similar processes applied to power plants and the like. This is also held true for FIG. 59 the spherical and/or round structural support mechanism frame, with or without rotational system and/or treads/threads shown as serrated (for example). The support frame can take numerous forms such as illustrated in FIG. 57 (rhombus) and FIG. 58 (parallelogram), for example. The guards, and/or screens can be fixed to the guards and or guard/grid frame and/or as separate apparatus. Thus the treads/threads (for example) of the rotational systems production of various functions and movement allows gas/particle separation to occur—examples of movement of function is swift, pivot, clockwise, (for example), time delayed, automated systems and/or hydraulics (for example—and/or for opening and closure of apparatus). For the appropriate function gas separation and or particle separation must occur. Numeral 32b exhibits the engine shaft extension(s) attachment and/or pole (of metal/material) thus adhered fixed/secured and/or attached to the guards/grids, caps, screens and/or extensions. Numeral 32a exhibits shaft from the high pressure turbine. Numeral 50a, 50b and 50c the screen fixed/secured adhered, apparatus (metal/material) attached to the engine and to the engine shaft extension(s) and or pole-screens that allows apparatus to be secured/fixed. Therefore, allowing the continuous motion from the engine to occur without obstruction of further automation thereby inducing motion created by Force, Force Kinetic allowing the rotation and/or function for gas separation and or particle separation to occur without minimizing engine thrust—a higher performance engine has been created. Since particles may vary in size due to the guard(s), cap(s) and screen(s) in not allowing particles of significant matter to be ingested, particles may also remain in the collection chamber(s) (not exhibited in FIG. 8 but shown in FIG. 1 and FIG. 2 numerals 18a and 18b) but which can be enclosed once particles enter from the duct(s) thereby offering and additional solution to this problem. This is a prime solution not only for numerous engines—various craft, jet turboprop, turboshaft, as well as for helicopters and other VTOL/VSTOL craft. This is a prime solution for engines, power plants and the like. The guard(s), cap(s) and/or screen(s) along with the mechanism is significant. A casing may be added as deemed fit shown in FIG. 1 and FIG. 3 numeral 52.

Figure 9:
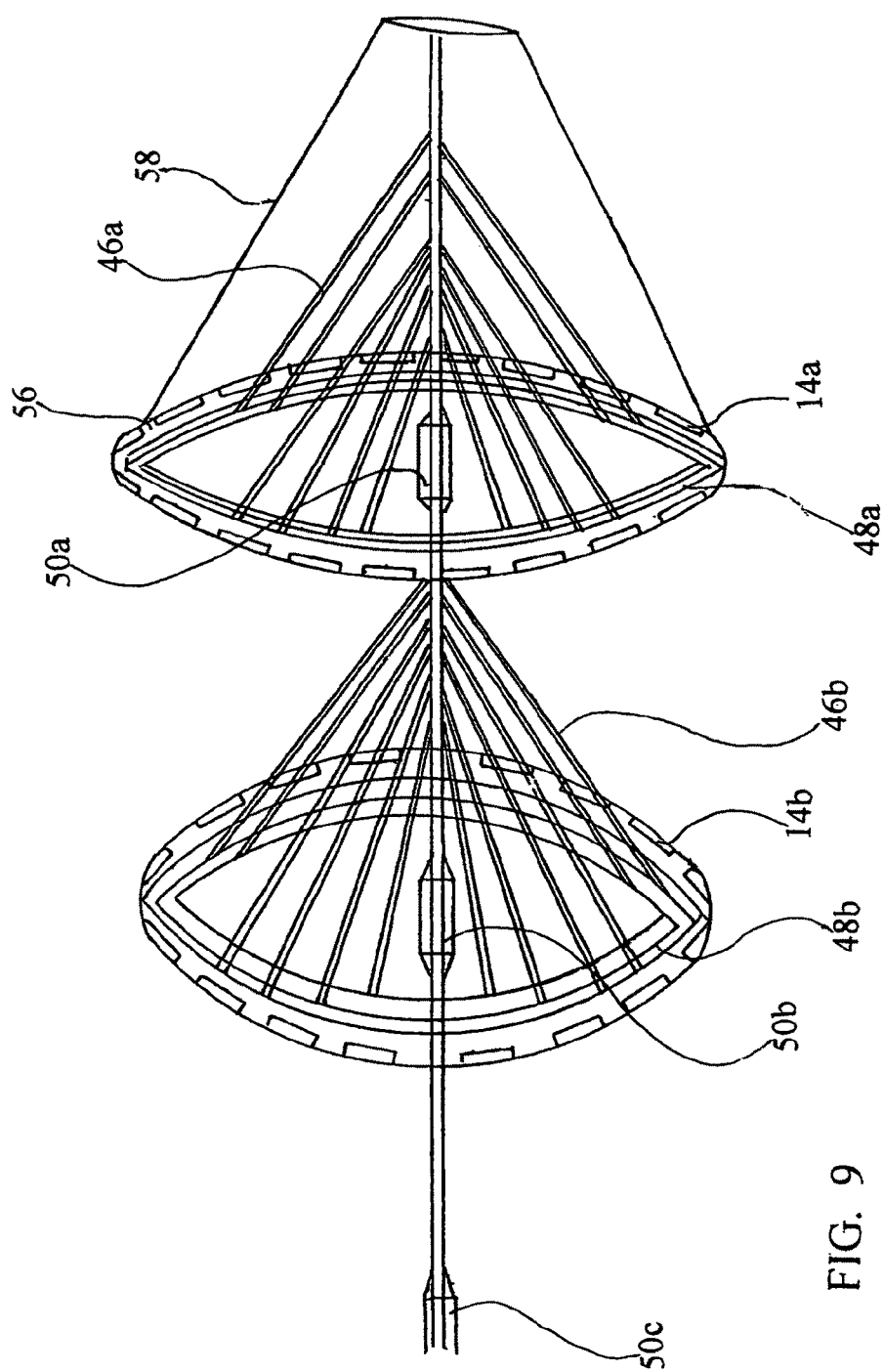
FIG. 9 shows an isometric partial expanded view of a double guards, caps and/or screens with engine attached apparatus and/or pole, with rotational systems.

FIG. 9 shows an isometric partial expanded view of a double guards, caps and/or screens with engine attached apparatus and/or pole, with rotational system.

The following apparatus are various manipulations of the rotational systems (FIG. 23 thru FIG. 45—rotational systems and or screens, guards, are of metal/material and can be in numerous forms—for example) can be separate apparatus and/or fixed/secured, adhered, and/or attached to the cowls and or base with or without treads/threads—as well as numerous methods can be used other than treads/threads (for example). Application of rotational system can be for various gas separation and or particle separation in various engines (for example compressor and combustion systems—for numerous engines, craft, power plants and the like. Variances in raised and or lowered in degrees of vanes, may also take a fly wheel composition FIG. 37 thru FIG. 43 allowing additional separation to occur and motion—whether turbine and or other systems as well as used in the guards, may also be used with conical/cones. The addition of a mesh (2 or more wiring systems) FIG. 46a thru 46d can be used in FIG. 23 thru FIG. 45 and in other mechanisms. Devices may also be stationary for other craft as mentioned, engines power plants and the like. All devices are independent and applied for numerous applications (and may also have curved aperture—for example) and thus interchanged on all apparatuses. Alternate guards, screens as discussed above and illustrated in FIG. 23-45 can also be incorporated into the embodiment illustrated in FIG. 3.

Figure 10:
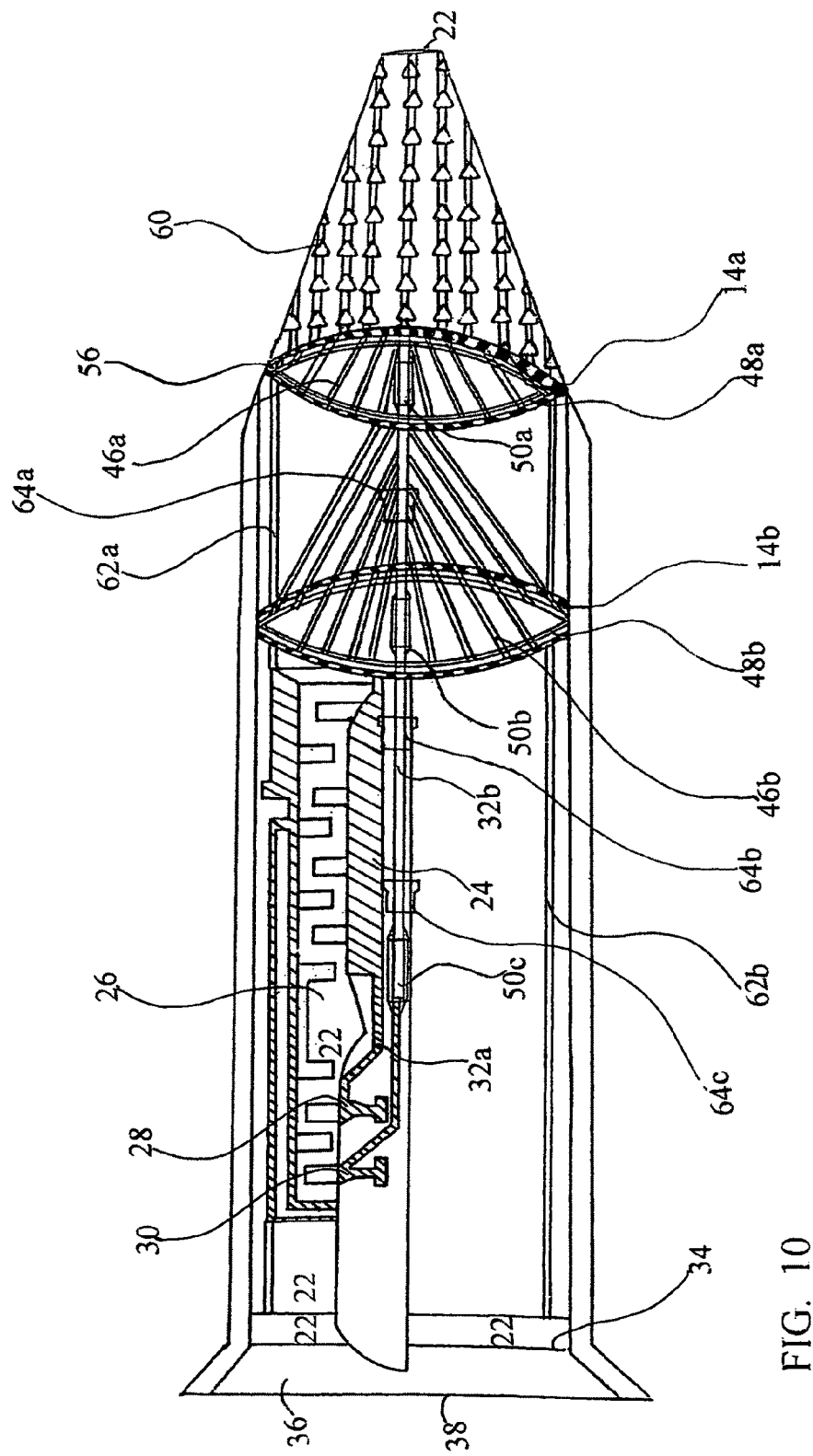
FIG. 10 shows an isometric partial expanded view of a retractable double guards, caps and/or screens with engine attached apparatus and/or pole, with rotational systems.
Figures 12, 13, 14:
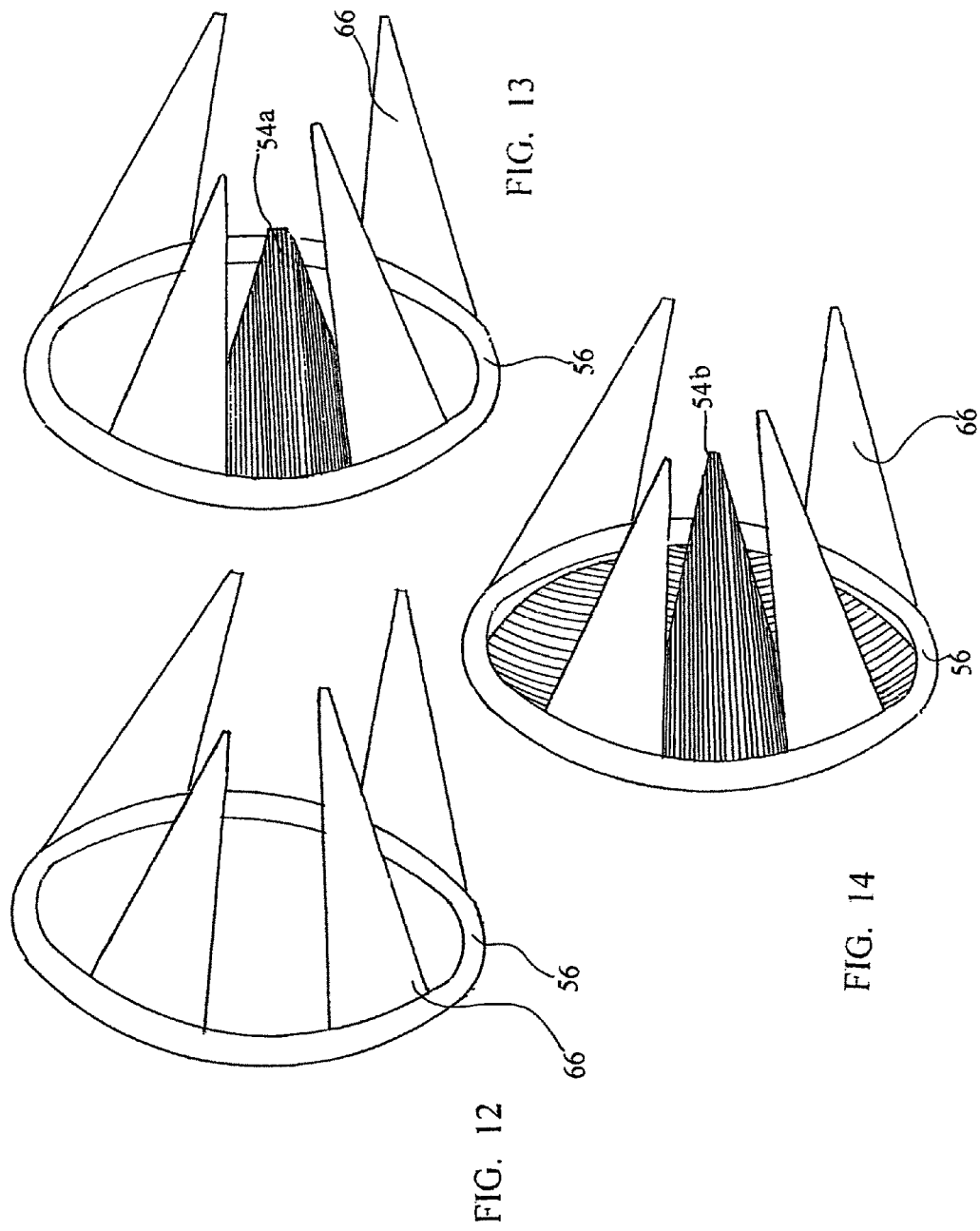
FIG. 12 shows dispersing conical with retraction process, allowing gas and/or particle separation to occur; conical may take multiple forms.
FIG. 13 shows dispersing conical with retraction process, allowing gas and/or particle separation to occur, additional conical may take multiple forms.
FIG. 14 shows dispersing conical with retraction process, allowing gas and/or particle separation to occur, additional conical may take multiple forms and vane guard thus shown in back-ground, aperture of the vane guard/grid shall have variance in aperture for gas and/or particle separation.

FIG. 10 illustrates another alternative embodiment of single/multiple guard(s), cap(s) and/or screen(s) with engine attached apparatus and/or pole with rotational system(s); exhibited in a isometric partial view of apparatus and noted that the guards, caps and or screens (can be interchanged) is shown with longitudinal and latitudinal form. In FIG. 10 numeral 60 exhibits the darted conical/cone with convex nose guard/grid, (conical/cones may be suited for example are FIG. 47 thru FIG. 56) exhibiting cowl and/or base as numeral 56 and a plurality of spokes 46a, 46b pivotally attached on one end to the base 56 forming a cone shape in one position where 46a, 46b generally divergent on one end shown, for example, in FIG. 10 one or more intermediate positions, for example, as shown in FIG. 12-14 wherein angle between the spokes 46a, 46b and the shaft 32b is varied from that shown in FIG. 10. The base 56 may be attached to the rotational systems noted in rectangular form exhibited as numeral 14a and 14b—this is one of the manipulations shown in FIG. 25 The rotational system(s) can be fixed to the guards of the cowl and/or base or as a separate apparatus (of metal/material); thus the rotational system(s) 14a and 14b can be fixed/secured, adhered and/or attached to the nacelle and or inlet. FIG. 10 numerals 46a and 46b (exhibits extensions/rods—46a 10 extensions/rods, 46b 12 extensions for example) can be separate apparatus—exhibits extension(s)/rod(s) which can be fixed/secured, adhered, and/or attached to the guards, caps, and/or screens; as well as fixed/secured, adhered, and/or attached to the engine shaft extension(s) and or pole apparatus. These extension(s)/rod(s) numerals 46a and 46b can extend inward and/or outward portion of the guard(s), cap(s), and/or screen(s); or form the screen latitudinal vane(s)—(if screen is added) fixed/secured, attached, and/or adhered to the inward portion of the guard(s), cap(s), and/or screens. Extensions/Rods 46a and 46b can also be in multiples of 2/numerous and or odd numbers, extensions/rods may have a curved aperture for greater gas and or particle separation (of metal/material). Conical/cones with multi vanes have a greater degree of gas and or particle separation thereby engine to function more efficiency.

As gaseous fluid, particles, and or air numeral 22, passes through the inlet which is at a high velocity by Force, Force Kinetic, it is turned or centrifuged circumferentially at such a downstream of the vanes, the gaseous fluid, particles, and or air has both angular and axial velocity. This is known as imparting "swirl" to the fluid stream. Small particles/gas and or matter (whether foreign or not) entrain in the air and or gaseous fluid's stream are also centrifuged, having small mass the gas/particles are carried along with the swirling air and or gaseous fluid. The particles/gas with the greater mass are not of our concern as such due to the guard(s), cap(s) and/or screen(s) are used for preventive measure. A particle/gas entrained in the air and or gaseous fluid's stream and centrifuged will have both tangential and axial velocity downstream of the turning vanes. Both tangential and axial velocity in theory not subjected to external forces travel in a straight line path to the outer periphery of the passageway. In practice, the swirling air and or gaseous fluid has significant effect on the particles/gas trajectory which can be compared roughly to that of a helix having increasing diameter in the downstream direction (as known). The rotational systems numerals 14a and 14b with or without treads/threads numerals 48a and 48b shall enable gas and or particle separation to take place as well as guard from foreign objects and or matter of significant mass. The gaseous fluid and or air shown as numeral 22 entering the engine through the inlet passes through the compressor numeral 24 where it is compressed, and hence to the combustor numeral 26 where the gaseous fluid and or air is mixed with fuel and burned. The hot gases of combustion emerges at a high velocity from the combustor numeral 26 and passes sequentially through the high pressure turbine numeral 28 and low pressure turbine numeral 30 where gases are expanded to extract energy there from. Energy extracted from the hot gases by turbine numeral 28 provides driving force for the compressor numeral 24 which is connected to turbine 28 by shaft numeral 32a. Energy extracted from the hot gases by turbine numeral 30 is a form of means, provides the driving force for the main engine drive shaft numeral 32b which delivers power to an energy using device, such as helicopter rotor system (not exhibited). After exiting turbine numeral 30 the hot gases of combustion passes through the engine exhaust duct numeral 34 which includes diffuser numeral 36 in which case gases are expanded and exit the engine numeral 38. This is the formal function of numerous jet engines. Ejector systems as well as conduits may also be added (not exhibited) in FIG. 10 but exhibited in FIG. 1 and FIG. 2, FIG. 6 numeral 40 includes control valve FIG. 6. Numeral 42 for controlling amount of gaseous fluid and or air bled from the compressor numeral 24 thus flow of the fluid through the conduits numerals 20a and 20b to increase efficiency of the gaseous engine thus may be turbine and or other types of engines power plants and the like. A modulating valve FIG. 6 numeral 44 regulates the flow in the conduit thereby increasing engine efficiency. The guards, caps and or screens as well as the rotational system 14a and 14b shown in FIG. 10 numeral 60 (darted guard) are also deemed appropriate use possible to be used in FIG. 31 thru FIG. 56 (of metal/material) can be fastened inside the air inlet of an aircraft and or the inlet of any craft, power plant and the like; as well as fastened to the nacelle exterior portion, and or air inlet of an aircraft and or the inlet of any craft extending outside the nacelle, similar processes applied to power plants and the like. This is also held true for FIG. 59 the spherical and/or round structural support mechanism frame, with or without rotational system and/or treads/threads shown as serrated (for example). The support frame can take numerous forms such as illustrated in FIG. 57 (rhombus) and FIG. 58 (parallelogram), for example. The guards, and/or screens can be fixed to the guards/grids and or guard frame and/or as separate apparatus. Thus the treads/threads (for example) of the rotational systems production of various functions and movement allows gas/particle separation to occur—examples of movement of function is swift, pivot, clockwise, (for example), time delayed, automated systems and/or hydraulics (for example—and/or for opening and closure of apparatus). For the appropriate function gas separation and or particle separation must occur. Numeral 32b exhibits the engine shaft extension(s) attachment and/or pole (of metal/material) thus adhered fixed/secured and/or attached to the guards, caps, screens and/or extensions. Numeral 32a exhibits shaft from the high pressure turbine. Numeral 50a, 50b and 50c the screen fixed/secured adhered, apparatus (metal/material) attached to the engine and to the engine shaft extension(s) and or pole-screens that allows apparatus to be secured/fixed. Therefore, allowing the continuous motion from the engine to occur without obstruction of further automation thereby inducing motion created by Force, Force Kinetic allowing the rotation and/or function for gas separation and or particle separation to occur without minimizing engine thrust—a higher performance engine has been created. Since particles may vary in size due to the guard(s), cap(s) and screen(s) in not allowing particles of significant matter to be ingested, particles may also remain in the collection chamber(s) (not exhibited in FIG. 10 but shown in FIG. 1 and FIG. 2 numerals 18a and 18b) but which can be enclosed once particles enter from the duct(s) thereby offering and additional solution to this problem. Formal retraction process shall commence by the conical/cone with dispersing movement (shown in FIGS. 12, 13, and 14) by center axis in multiples of 2 in numbers and/or odd numbers thus retract over (may also be inward—in the inlet) the inlet and thus allow the extensions/rods to commence into a folding and/or laced pattern for example as thus conical/cone may also be deemed into a folding or laced pattern (shown by isometric partial expanded view FIG. 11) which shall be taken into account by the type of inlet of a particular aircraft as well as the type of engine. This can also be significant process for other engines and power plants and the like. FIG. 10 numerals 62a and 62b exhibit the retraction slots in which case for example the hydraulics/automation process shall commence. The retraction apparatus exhibited in FIG. 10 numerals 64a, 64b, and 64c shall allow the attached apparatus and/or pole to be condensed within the pole in a stacking manner or on the exterior portion of the pole in a stacking manner—for example—FIG. 18 and FIG. 19 exhibit an expanded view of retractors (this shall vary on the type of craft and/or engine). If centrifuge, chamber, manifold process, particle collector is deemed fit to use thus variances on the type of aircraft and/or crafts engine as well as power plants and the like, similar process shall commenced thereby a folding and or laced pattern—for example. Prior works exhibited aircraft—conical/cones used for directional purposes by means of hydraulic movement thus back and forth although a lack of efficiency and energy has not allowed these types of aircraft to attain the highest performance deemed possible, by the use of the rotational system(s) and being cost effective and efficient we attain a higher degree of performance that allows gas/particle separation to take place as well as maintain and not compromising the engine thrust. The multi vane conical—for example offers greater degree of gas/particle separation than a solid conical. Variances in degrees can occur with structural configuration of guard(s), cap(s) and/or screen(s). Thus the three multi vane conical/cone exhibited FIG. 55 exhibits centrifuge process on the external means of the conical thereby offering as well as direction this is also deemed similar in nature with FIG. 56 the multi deflector conical/cone offers gas separation, directional purposes as well as deflecting shrapnel from enemies attack. This is a prime solution not only for numerous engines—various craft, jet turboprop, turboshaft, as well as for helicopters and other VTOL/VSTOL craft. This is a prime solution for engines, power plants and the like. The guard(s), cap(s) and/or screen(s) along with the mechanism is significant. A casing may be added as deemed fit shown in FIG. 1 and FIG. 3 numeral 52. FIG. 9 shows an isometric partial expanded view of a double guards, caps and/or screens with engine attached apparatus and/or pole, with rotational system. In addition, alternate guards/grids, screens as discussed above can be incorporated into the embodiment illustrated in FIG. 10.

The following apparatus are various manipulations of the guards, caps with conical/cones (apparatus can be independent of each other), shown with cowls and/or base can be fixed/secured, adhered, and/or attached; thus by being fixed/secured, adhered, and/or attached to the rotational ring and or frames for multiple functions (apparatus can be separate) of FIG. 1 numerals 14a and 14b with or without treads/threads. Extensions/Rods FIG. 1 numerals 46a and 46b (apparatus can be independent and may have a curved aperture), can be fixed/secured, adhered, positioned and/or attached to guards, caps and/or screens; as well as engine shaft extension attachment and/or pole, and/or rotational systems apparatus. All guards/grids, caps, noses can be convex/concave, pointed and or solid (for example) as well as other manipulations listed (apparatus independently and/or whole can be of metal/material):

FIG. 47 the guard shown as conical/cone, with multiple longitudinal and latitudinal lines/vanes form (rectangular-convex nose of the guard), shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 48 the guard shown as conical/cone, with multiple longitudinal and latitudinal lines/vanes form (convex nose of the guard with smaller scale of graduating metal/material or larger scale of metal/material—the nose of the guard, cap can be interchanged with other manipulations), shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 49 the guard, cap shown as conical/cone with solid form (convex nose guard), shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 50 the guard, cap shown as conical/cone, with multiple slits in longitudinal lines/vanes form (convex nose guards), shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 51 the guard, cap shown as conical/cone, with multiple longitudinal lines/vanes form (convex nose guard), shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 52 the guard, cap shown as conical/cone, pierced triangular form or jagged—with multiple in triangular for or jagged piercings (convex nose guard can also be in other forms as well as geometric), shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 53 the guard, cap shown as conical/cone, with multiple longitudinal lines/vanes form (convex nose guard with nose guard with cylindrical latitude form). FIG. 53 can also be formed with latitudinal lines/vanes without being cylindrical, shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 54 the guard, cap shown as conical/cone, pierced triangular form—jagged with multiple in piercing as well as longitudinal lines/vanes form (convex nose guard can also be in other forms—latitudinal lines may also be added for additional obstruction and or gas/particle separation, shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 55 the guard, cap shown as conical/cone, with multiple longitudinal lines/vanes (convex nose guard) form greater gas/particle separation with external centrifuge manifold particle collector-separator thus offering centrifuging process by turning vanes each extending an arcuate distance of approximately 120 degrees, (for example), shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 56 the guard, cap shown as conical/cone, with multiple external vanes (vanes variance raised and/or lowered in degrees)—solid and/or partial form—convex nose guard (for example). Exterior of a series of turning vanes each extending an accurate distance of approximately 120 degrees—for example (degrees may vary depending on how many vanes are added to the conical/cone), shown to adhere to the cowls and/or base, as well as adhering to the rotational rings numerals 14*a* and 14*b* with or without treads/threads; thus can be applied to FIG. 23 thru FIGS. 45, 57, 58, and 59 respectively. This conical/cone is prime for deflecting shrapnel and thus returning shrapnel to the enemy without causing obstruction to the engine components and yet offer maximization of gas and or particle separation. Note: conical/cone may also take latitudinal lines/vanes—not exhibited.

The following device is the "Structural Support Mechanism/Frame System," for numerous craft, jets, turboprops, turboshaft, and other VTOL/VSTOL as well as engines power plants and the like—applications of this mechanism may also be for the combustor and or compressor for appropriate gas separation and or particle separation; with or without rotational system as well as with or without treads/threads (for example). Rotational system may be within structural support mechanism and or prior to the structural support mechanism and/or henceforth thereafter. Possible inclusion of guards, caps, and/or screens with this structural support mechanism.

FIG. 57 the rhombus structural support mechanism form with or without internal rotational systems, with or without treads/threads—for example, the rotational system is shown rhombus—rectangular form as shown as FIG. 25 can be fixed/secured, adhered, attached inside inlet of a craft, as well as fastened to the nacelle exterior portion, and/or in the inlet extending outside the nacelle (metal/material). This is one of many configurations and applications of the structural support mechanism;

FIG. 58 the parallelogram structural support mechanism form with or without internal rotational systems, with or without treads/threads—for example, the rotational system is shown rectangular form as FIG. 25 can be fixed/secured, adhered, attached inside inlet of a craft, as well as fastened to the nacelle exterior portion, and/or in the inlet extending outside the nacelle (metal/material). This is one of many configurations and applications of the structural support mechanism;

FIG. 59 the spherical/round structural support mechanism form with or without internal rotational systems, with or without treads/threads—for example, the rotational system is shown rectangular form as FIG. 25 can be fixed/secured, adhered, attached inside inlet of a craft, as well as fastened to the nacelle exterior portion, and/or in the inlet extending outside the nacelle (metal/material). This is one of many configurations and applications of the structural support mechanism;

The following apparatus are nose guards, caps shown in conical/cone form with various interchanging nose guards, caps—may take the configuration of convex, concave and or solid—for example. All nose guards are independent and thus interchangeable on all conical/cones. The following manipulations of the conical/cones, nose/guards, caps:

FIG. 60 nose guard, cap shown as conical/cone form is solid formation (cone pointed); such a nose guard, cap can be solid in whole and or partial and in kind.

FIG. 61 nose guard, cap shown as conical/cone form has multiple longitudinal and latitudinal lines/vanes form (cone pointed); such a nose guard, cap can be solid in whole and or partial and in kind.

FIG. 62 nose guard, cap shown as conical/cone form is solid formation (convex form); such a nose guard, cap can be solid in whole and or partial and in kind.

FIG. 63 nose guard, cap shown as conical/cone form has multiple longitudinal and latitudinal lines/vanes form (convex form); such a nose guard, cap can be solid in whole and or partial and in kind.

FIG. 64 nose guard, cap shown as conical/cone form is solid formation (rectangular form); such a nose guard, cap can be solid in whole and or partial and in kind.

FIG. 65 nose guard, cap shown as conical/cone form has multiple longitudinal and latitudinal lines/vanes form (rectangular form); such a nose guard, cap can be solid in whole and or partial and in kind.

FIG. 66 nose guard, cap shown as conical/cone form is solid formation (concave form); such a nose guard, cap can be solid in whole and or partial and in kind.

FIG. 67 nose guard, cap shown as conical/cone form has multiple longitudinal and latitudinal lines/vanes form (concave form); such a nose guard, cap can be solid in whole and or partial and in kind.

Figure 11:
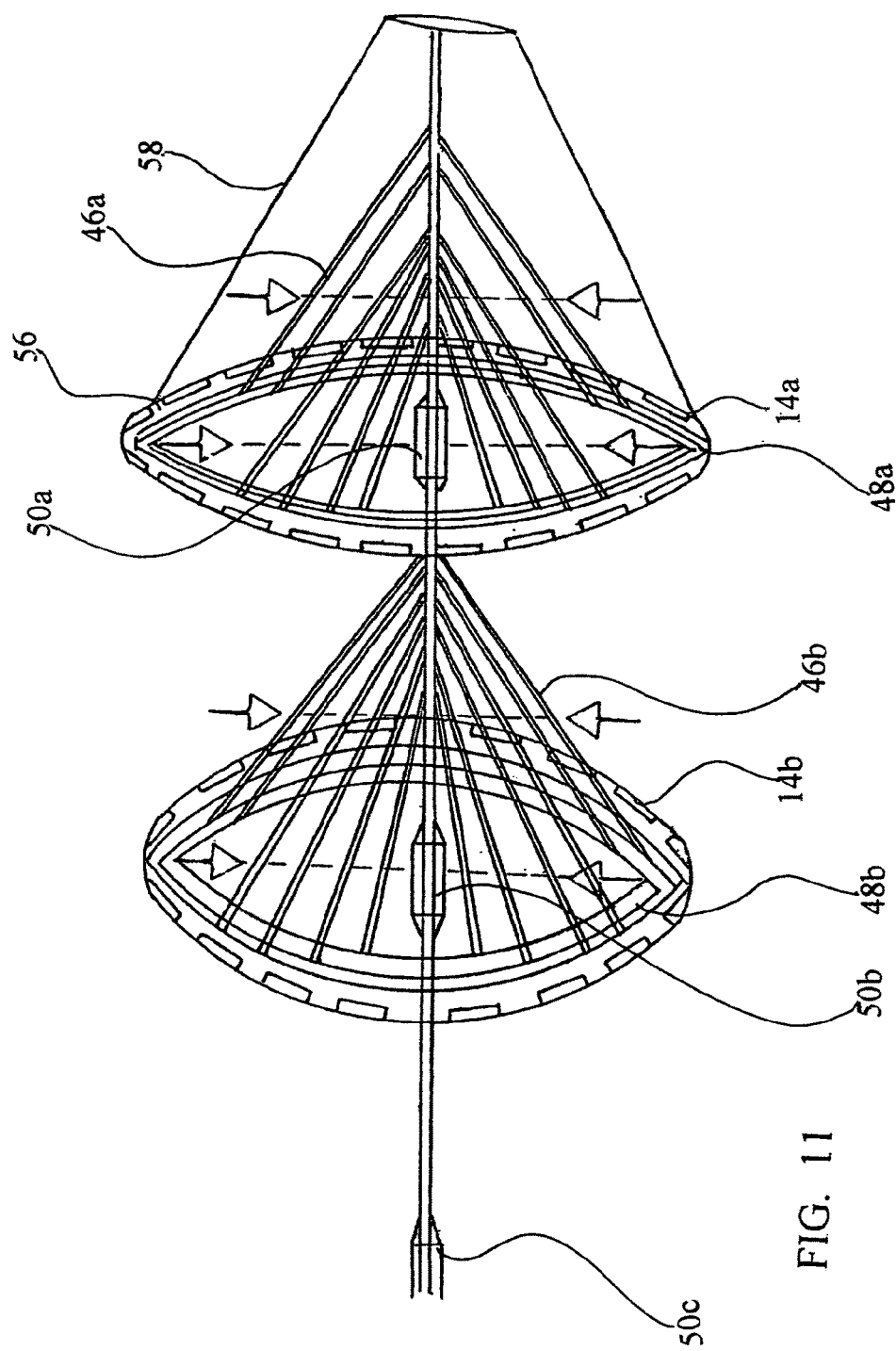
FIG. 11 shows an isometric partial expanded view of a double guards, caps and/or screens with engine attached apparatus and/or pole, with rotational systems; exhibits folding and/or laced pattern for retraction process.

FIG. 11 an isometric partial expanded view of the double guards, caps and/or screen with engine attach apparatus and or pole, with rotational systems. The formal process and thus description of is noted in FIG. 10 although in FIG. 11 we note the solid partial view conical as numeral 58.

FIG. 12 shows dispersing conical exhibited in numeral 66 and thus exhibiting cowl numeral 56 for retraction process—additional manipulations in dispersion and retraction process is noted for conical/cones, guard(s), screen(s) may take a multiple forms for example FIG. 47 thru FIG. 56—for example. Dispersing for example may be in multiples of 2 in numbers and/or odd numbers of metal/material.

FIG. 13 shows dispersing conical exhibited in numeral 66 and thus exhibiting cowl numeral 56 for retraction process—additional manipulations in dispersion and retraction process is noted for conical/cones, guard(s), screen(s) may take a multiple forms for example FIG. 47 thru FIG. 56—for example. Dispersing for example may be in multiples of 2 in numbers and/or odd numbers of metal/material. Exhibiting also 54*a* the additional multi vane conical; as dispersing occurs the multi vane conical is exhibited to the forefront by hydraulic/automated means to maintain the integrity of the engine components as dispersing occurs.

FIG. 14 shows dispersing conical exhibited in numeral 66 and thus exhibiting cowl numeral 56 for retraction process—additional manipulations in dispersion and retraction process is noted for conical/cones, guard(s), screen(s) may take a multiple forms for example FIG. 47 thru FIG. 56—for example. Dispersing for example may be in multiples of 2 in numbers and/or odd numbers of metal/material. Exhibiting also 54*b* the additional multi vane conical with spherical vanes; as dispersing occurs the multi vane conical is exhibited to the forefront by hydraulic/automated means to maintain the integrity of the engine components as dispersing occurs.

FIG. 15 shows the engine shaft extension security attachment and/or pole, diamond formation (for example); The device shall allow security to be maintained without obstruction of function by the rotational system(s).

FIG. 16 shows the engine shaft extension security attachment and/or pole cylindrical form (for example); The device shall allow security to be maintained without obstruction of function by the rotational system(s).

FIG. 17 shows the engine shaft extension security attachment and/or pole, in rectangular form (for example); The device shall allow security to be maintained without obstruction of function by the rotational system(s).

FIG. 18 shows the multiple section engine attachment for retraction process of the apparatus and/or pole, this device may be used in FIG. 10. Not exhibited although deemed fit is the multi-laced engine attachment apparatus and/or pole may also have retracting properties or without (for example).

FIG. 19 shows the multiple section engine attachment for retraction process of the apparatus and/or pole; this device may be used in FIG. 10 numerals 64a, 64b, and 64c.

FIG. 20 shows longitudinal apparatus and/or pole for numerous dual inlets, with a dual extending apparatus from the pole for inlet-power plants and the like; thus shall function similar to engine shaft attached apparatus and/or pole although dual inlet. This device may be used for various craft, engines power plants and the like.

FIG. 21 shows longitudinal apparatus and/or pole for inlet, this device may be used for numerous craft, engines, power plants and the like.

FIG. 22 shows longitudinal apparatus and/or pole for numerous dual inlets, with a dual extending apparatus for both sides of the pole/opposite side of the pole for the inlet. This device may be used for numerous craft, engines, power plants and the like.

The following embodiment FIG. 68 shows an isometric view of gaseous intake cavity with centrifuging process, chamber formed and spatial vanes—manifold, with engine attached apparatus and/or pole, with rotational systems; gaseous intake cavity centrifuged process may be induced also by a motor (not exhibited) and/or extensions/rods may also be applied with embodiment for induction process gaseous intake cavity. Guard(s), Screens, and Cap(s) may also be applied to gaseous intake cavity; exhibiting a static free chamber and or purification chamber. All systems are independent of each other and all systems may be interchanged with each other.

FIG. 68 is the embodiment exhibited in isometric view of gaseous intake cavity (the guard(s), caps and/or screens can be interchanged, not exhibited) is shown with longitudinal and latitudinal form. This embodiment as well as previous embodiments may consists of dispersing effect and/or retraction. In FIG. 68 numeral 10a and 10b we note the screen, can be fixed/secured, adhered, positioned and/or attached to the bases of the apparatus (can be separate apparatus), and thus fastened. The centrifuge, chamber, and spatial vanes—manifold, exhibited by numerals 12a,12b and 12c. The spatial vanes exhibits manifold—patterns which separates particles, gases and or air exhibited a pair of spaced walls the screens—for example—(pierced screen shown as FIG. 33 internal part can be of the meshed (2 or more wires)—guards, screen(s) with vane(s)—for example—shown as FIG. 46a thru 46d) with rotational system apparatus—exhibited by numeral 14a and 14b as well as 14c and 14d, with or without treads/threads—for example. Define as annular passageway there between, having at opposite ends thereof and outlet flow of communication through two ducts exhibited by numerals 16a and 16b located at opposite ends of the chamber. The vanes in the chamber exhibited by numeral 12a, 12b, and 12c axially define an annular extraction manifold. The three vanes (for example) each of which extends an arcuate distance, with numerous dimensions—for example and or are dimensionless—for example, which may be said no particle, gas, and or air need to travel circumferentially. Gas, particles, and or air prior entering the extraction manifold process which 3 spatial vanes (for example) rebound into the engine and/or motor for example as thus the inlet is reduced. Variances in degrees can occur with structural configuration of guard(s), cap(s) and/or screen(s). Number of collector vanes may vary to meet the required amount for collector/separator efficiency. The ducts are in direct communication with the collection chambers exhibited by numerals 18a and 18b, and thus the collection chamber is in direct communication with the two conduits exhibited by numeral 20a and 20b. A chamber 18a, 18b may include mesh (2 or more wires—for example) for aerodynamic purposes in various forms as discussed herein.

As gaseous fluid, particles, and or air numeral 22a, passes through the gaseous intake cavity which is at a high velocity by Force, Force Kinetic, it is turned or centrifuged circumferentially at such a downstream of the vanes, gaseous fluid, particles, and or air has both angular and axial velocity. This is known as imparting "swirl" to the fluid stream. Small particles/gas and or matter (whether foreign or not) entrain in the gaseous fluid's, particle, and/or air stream are also centrifuged, having small mass the gas/particles are carried along with the swirling air and or gaseous fluid. The particles/gas with the greater mass are not of our concern as such due to the guard(s), cap(s) and/or screen(s) are used for preventive measure. A particle/gas entrained in the gaseous fluid's, particle fluid's, and or air stream and centrifuged will have both tangential and axial velocity downstream of the turning vanes. Both tangential and axial velocity in theory not subjected to external forces travel in a straight line path to the outer periphery of the passageway. In practice, the swirling gaseous fluid, particles, and or air has significant effect on the particles/gas trajectory which can be compared roughly to that of a helix having increasing diameter in the downstream direction (as known). Thus the centrifuging and the entrainment through the turning vanes numerals 12a, 12b, and 12c into the extraction manifold pattern from which particles/gas are collected through the ducts numerals 16a and 16b; static free chamber and or purification chamber exhibited numeral 54. The rotational systems on the chamber exhibited as numerals 14a, 14b,14c, and 14d shall additionally enable the centrifuging process to be enacted (with or without treads/threads—for example); as well as engine shaft attached apparatus components.

FIG. 69 exhibited without shaft apparatus, without a spatial wall of the gaseous intake cavity, and with spatial vanes exhibiting entropic view enacted numeral 22a which in turn produces the manifold pattern process. Spatial vanes may be attached in centrifuge chamber for example. Forces exhibited are kinetic, electromagnetic, electrostatic, and thermodynamic create a chamber through these centrifugal forces. This type of static free chamber is produced by the purification process which may have zero particles and or limited particles which would vary on momentum—velocity of the centrifuging process in the creation of the chamber. Static free chamber, purification chamber exhibited as numeral 54 may be before processes and henceforth after processes in singular and or multiple sequencing. Variances in dimensions and may also be dimensionless. The system is applicable for various craft, engines, motors, jets, power plants and the like. All apparatus is independent of each other.

FIG. 70 shows the process of the reaction phase exhibiting forces, kinetic, electromagnetic, electrostatic, and thermodynamic of the gaseous intake cavity—for numerous craft, power plants and the like.

The gaseous fluid, particles, and or air shown as numeral 22 entering the gaseous intake cavity passes through an passageway, inlet, of a craft, engine, motor, jets, power plants and the like—passes through a compressor numeral 24 where it is compressed, and hence to the combustor numeral 26 where the gaseous fluid, particles, and or air is mixed with fuel and burned. The hot gases of combustion emerges at a high velocity from the combustor numeral 26 and passes sequentially through the high pressure turbine numeral 28 and low pressure turbine numeral 30 where gases are expanded to extract energy there from. Energy extracted from the hot gases by turbine numeral 28 provides driving force for the compressor numeral 24 which is connected to turbine 28 by shaft numeral 32a. Energy extracted from the hot gases by turbine numeral 30 is a form of means, provides the driving force for the main engine drive shaft numeral 32b which delivers power to an energy using device, such as helicopter rotor system (not exhibited). After exiting turbine numeral 30 the hot gases of combustion passes through the engine exhaust duct numeral 34 which includes diffuser numeral 36 in which case gases are expanded and exit the engine numeral 38. This is the formal function of numerous craft, jets, power plant and or the like engines.

Ejector systems exhibited in FIG. 6 numeral 40 includes control valve, numeral 42 for controlling amount of gaseous fluid and or air bled from the compressor numeral 24 thus flow of the fluid through the conduits numerals 20a and 20b to increase efficiency of the gaseous engine thus being turbine and or other types of engines power plants and the like. When particle collector separation is not deemed necessary the ejector system may be used to interrupt the flow of the gaseous fluid and or air being bled. A modulating valve FIG. 6 numeral 44 regulates the flow in the conduit thereby increasing engine efficiency. The guards, caps and or screens as well as the rotational system shown in FIG. 68 numeral 10a and 10b as well as FIG. 31 thru FIG. 56(of metal/material) can be fastened inside a craft, air inlet of multiple engines, motors, jets, power plant and the like; as well as fastened to the nacelle exterior portion; and or air inlet of an aircraft and or the inlet of any craft extending outside the nacelle, similar processes applied to power plants and the like. This is also held true for FIG. 59 the spherical and/or round structural support frame, with or without rotational system and/or treads/threads shown as serrated (for example). The support mechanism/frame can take numerous forms such as illustrated in FIG. 57 (rhombus) and FIG. 58 (parallelogram), for example. The guards, and/or screens can be fixed to the guards and or guard frame and/or as separate apparatus. Numeral 14a and 14b exhibits the rotational systems noted in rectangular form-this is one of the manipulations shown in FIG. 25. The rotational systems can be fixed to the guards cowls and/or base or as a separate apparatus (metal/material); thus the rotational systems 14a, 14b, 14c, and 14d can be fixed/secured, adhered and or attached to the nacelle/air inlet and thus any inlet or similar in nature for applicable to power plants and the like. All figures exhibited made of metal/material.

FIG. 68 numeral 46a and 46b (16 extension/rods in each guards, caps and or screen—for example)—can be separate apparatus—exhibits extension(s)/rod(s) which can be fixed/secured adhered, and/or attached to the guard, cap and/or screens; as well as can be fixed/secured, adhered, and/or attached to the engine shaft apparatus and/or pole. The extensions/rods numeral 46a and 46b can extend from the inward and or outward portion of the guards, caps and/or screens; or from the screens latitudinal vane(s) and fixed in the inward portion of the screen as exhibited (extensions/rods 46a and 46b can also be in multiples of 2/numerous in numbers and/or odd numbers—of metal/material, are fixed/secured, positioned and/or adhered to numeral 48a and 48b, which exhibits the treads/threads of the rotational systems allowing function to occur. Extensions/Rods can also take lacing configuration and/or longitudinal configuration as well as having a curved aperture (for example). Thus the treads/threads (for example) of the rotational systems production of various functions and movement allows gas separation to occur—examples of movement of function is swift, pivot, clockwise, (for example), time delayed, automated systems and/or hydraulics (for example—and/or for opening and closure of apparatus). For the appropriate function gas separation and or particle separation must occur. Numeral 32b exhibits the engine shaft extension(s) attachment and/or pole (of metal/material) thus adhered fixed/secured and/or attached to the guards, caps, screens and/or extensions. Numeral 32a exhibits shaft from the high pressure turbine. Numeral 50a, 50b, and 50c the screen fixed/secured adhered, apparatus (metal/material) attached to the engine and to the engine shaft extension(s) and or pole-screens that allows apparatus to be secured/fixed. Therefore, allowing the continuous motion from the engine to occur without obstruction of further automation thereby inducing motion created by Force, Force Kinetic allowing the rotation and/or function for gas separation and or particle separation to occur without minimizing engine thrust—a higher performance engine has been created. Forces exhibited in the gaseous intake cavity are kinetic, electromagnetic, electrostatic, and thermodynamic, again created by centrifugal process there by forming chamber—purification process.

Since particles may vary in size due to the guard(s), cap(s) and screen(s) in not allowing particles of significant matter to be ingested, particles may also remain in the collection chamber(s) which can be enclosed once particles enter from the duct(s) thereby offering and additional solution to this problem. The collection chamber 18a and 18b may include a mesh—(2 or more wires for example) as discussed above. This is a prime solution not only for numerous engines—various craft, jets, jet turboprop, turboshaft, as well as for helicopters and other VTOL/VSTOL craft. This is a prime solution for engines, power plants and the like. The guard(s), cap(s) and/or screen(s) along with the mechanism is significant. A casing may be added as deemed fit shown as numeral 52.

The following apparatus are various manipulations of the rotational systems (FIG. 23 thru FIG. 45—rotational systems and or screens, guards, are of metal/material and can be in numerous forms—for example) can be separate apparatus and/or fixed/secured, adhered, and/or attached to the cowls and or base with or without treads/threads—as well as numerous methods can be used other than treads/threads (for example). Application of rotational system can be for various gas separation and or particle separation in various engines (for example compressor and combustion systems—for numerous engines, motors, craft, jets, power plants and the like. Variances in raised and or lowered in degrees of vanes, may also take a fly wheel composition FIG. 37 thru FIG. 43 allowing additional separation to occur and motion—whether turbine and or other systems as well as used in the guards, may also be used with conical/cones. The addition of a mesh (2 or more wiring systems) FIG. 46a thru 46d can be used in FIG. 23 thru FIG. 45 and in other mechanisms. Devices may also be stationary for other craft as mentioned, engines power plants and the like. All devices are independent and applied for numerous applications (and may also have curved aperture—for example) and thus interchanged on all apparatuses. Alternate guards, screens as discussed above and illustrated in FIG. 23-45 can also be incorporated into the embodiment illustrated in FIG. 3.

FIG. 23 rotational ring with serrated form (can also be inverted), shown to adhere to the cowls and/or base, with or without treads/threads.

FIG. 24 rotational ring with jagged form (can also be inverted), shown to adhere to the cowls and/or base, with or without treads/threads.

FIG. 25 rotational ring with rectangular form (can also be inverted), shown to adhere to the cowls and/or base, with or without treads/threads.

FIG. 26 rotational ring with jagged interlocked form (can also be inverted), shown to adhere to the cowls and/or base, with or without treads/threads.

FIG. 27 rotational ring with interlocked form (can also be inverted), shown to adhere to the cowls and/or base, with or without treads/threads.

FIG. 28 rotational ring as coiled form (can also be inverted without ring but may take ring formation or other forms—for example as well as numerous coils), shown to adhere to the cowls and/or base, with or without treads/threads.

FIG. 29 rotational ring as slotted form (can also be inverted on the outside as well as internal portion of the ring—for example as well as numerous slots), shown to adhere to the cowls and or base, with or without treads/threads.

FIG. 30 rotational ring as chain linked form (can also be inverted without ring but may take ring formation or other forms—for example as well as numerous links), shown to adhere to the cowls and/or base, with or without treads/threads.

FIG. 31 rotational ring shown with screen—multiple in longitudinal and latitudinal lines/form (can also be without ring but in ring formation or other forms—for example), shown to adhere to the cowls and/or base, with or without treads/threads.

FIG. 32 rotational ring shown with screen—multiple in latitudinal lines/for (can also be without ring but in ring formation or other forms—for example), shown to adhere to the cowls and/or base, with or without treads/threads.

FIG. 33 rotational ring shown with screen-pierced form—multiple piercing (can also be without ring but in ring formation or other forms—for example—solid metal/material with pierced, exhibited with height, width, and depth formation, can also be in other forms geometric-forms for example), shown to adhere to the cowls and/or base, with or without treads/threads.

FIG. 34 rotational ring shown with screen—multiple in longitudinal lines/form (can also be without ring but in ring formation or other forms—for example), shown to adhere to the cowls and/or base, with or without treads/threads.

FIG. 35 rotational ring shown with screen—multiple in longitudinal and latitudinal lines/form (thicker/bolder form, can also be without ring but in ring formation or other forms—for example), shown to adhere to the cowls and/or base, with or without treads/threads. FIG. 36 rotational ring shown with screen—multiple in longitudinal and latitudinal lines/form—pierced—(can also be without ring but in ring formation or other forms—as well as geometric), shown to adhere to the cowls and/or base, with or without treads/threads.

FIG. 37 rotational ring shown with screen multiple vanes (variance raised/lowered in degrees)—screen in longitudinal and latitudinal lines/form. Multiple vanes with screen, (multiples of 2 and or odd number of wires). Apparatus can also be without ring but in ring formation or other.

FIG. 38 rotational ring shown with screen multiple vanes (variance raised/lowered in degrees)—screen in latitudinal lines/form. Multiple vanes with screen, (multiples of 2 and or odd number of wires). Apparatus can also be without ring but in ring formation or other forms—for example);

FIG. 39 rotational ring shown with screen-pierced form and multiple vanes (variance raised/lowered in degrees)—multiple piercing. Multiple vanes with screen, (multiples of 2 and or odd number of wires). Apparatus can also be without ring but in ring formation or other forms—for example (solid metal/material with pierced formation, can also be in other forms as well as geometric—for example), FIG. 46a thru 46d shown as the internal mesh for pierced mechanism, the mesh can also be used in other mechanisms and or manipulations.

FIG. 40 rotational ring shown with screen multiple vanes (variance raised/lowered in degrees)—screen in longitudinal and latitudinal lines/form. Multiple vanes with screen, (multiples of 2 and or odd number of wires). Apparatus can also be without ring but in ring formation or other forms—for example);

FIG. 41 rotational ring shown with screen multiple vanes (variance raised/lowered in degrees)—screen in longitudinal and latitudinal lines/form (thicker/bolder form). Multiple vanes with screen, (multiples of 2 and or odd number of wires). Apparatus can also be without ring but in ring formation or other forms—for example);

FIG. 42 rotational ring shown with screen multiple vanes (variance raised/lowered in degrees)—screen in longitudinal and latitudinal lines/form-pierced (can also be in other forms as well as geometric). Multiple vanes with screen, (multiples of 2 and or odd number of wires). Apparatus can also be without ring but in ring formation or other forms—for example);

FIG. 43 rotational ring shown with screen—screen consists of multiple vanes (variance raised/lowered in degrees), with or without treads/threads—for example;

FIG. 44 rotational ring shown with screen—screen in longitudinal and latitudinal lines/form pierced triangular form (can be in other forms as well as geometric compositions);

FIG. 45 rotational ring shown in cube form with height, width, and depth, chip, multiple (can also be without ring with or without ring formation—other forms such as square for example). Solid metal/material with or without cubes and or cubes may consists of internal 2 or more wires odd numbers, side and/or bottom mesh—wires of 2 or more. Numerous geometric forms may take place with this guard;

FIG. 46a-46d shown as internal mesh—wires for the pierced mechanism; this can also be used in numerous functions in accordance to the mechanism and/or guard; FIGS. 46a, 46b, 46c, and 46d consists of variance in meshing—wire mesh:

46a. is latitudinal, variance in degrees of aperture, for example;

46b. is latitudinal and longitudinal and variance in degrees of aperture, dense—for example;

46c. is longitudinal, variance in degrees of aperture, for example;

46d. is latitudinal and longitudinal variance in degrees of aperture, for example;

The following apparatus are various manipulations of the guards, caps with conical/cones (apparatus can be independent of each other), shown with cowls and/or base can be fixed/secured, adhered, and/or attached; thus by being fixed/secured, adhered, and/or attached to the rotational ring and or frames for multiple functions (apparatus can be separate) of FIG. 1 numerals 14a and 14b with or without treads/threads. Extensions/Rods FIG. 1 numerals 46a and 46b (apparatus can be independent and may have a curved aperture), can be fixed/secured, adhered, positioned and/or attached to guards, caps and/or screens; as well as engine shaft extension attachment and/or pole, and/or rotational systems apparatus. All guards/grids, caps, Noses can be convex/concave, pointed and or solid (for example) as well as other manipulations listed (apparatus independently and/or whole can be of metal/material):

FIG. 47 the guard shown as conical/cone, with multiple longitudinal and latitudinal lines/vanes form (rectangular-convex nose of the guard), shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 48 the guard shown as conical/cone, with multiple longitudinal and latitudinal lines/vanes form (convex nose of the guard with smaller scale of graduating metal/material or larger scale of metal/material—the nose of the guard, cap can be interchanged with other manipulations), shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 49 the guard, cap shown as conical/cone with solid form (convex nose guard), shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 50 the guard, cap shown as conical/cone, with multiple slits in longitudinal lines/vanes form (convex nose guards), shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 51 the guard, cap shown as conical/cone, with multiple longitudinal lines/vanes form (convex nose guard), shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 52 the guard, cap shown as conical/cone, pierced triangular form or jagged—with multiple in triangular for or jagged piercings (convex nose guard can also be in other forms as well as geometric), shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 53 the guard, cap shown as conical/cone, with multiple longitudinal lines/vanes form (convex nose guard with nose guard with cylindrical latitude form). FIG. 53 can also be formed with latitudinal lines/vanes without being cylindrical, shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 54 the guard, cap shown as conical/cone, pierced triangular form—jagged with multiple in piercing as well as longitudinal lines/vanes form (convex nose guard can also be in other forms—latitudinal lines may also be added for additional obstruction and or gas/particle separation, shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 55 the guard, cap shown as conical/cone, with multiple longitudinal lines/vanes (convex nose guard) form greater gas/particle separation with external centrifuge manifold particle collector-separator thus offering centrifuging process by turning vanes each extending an arcuate distance of approximately 120 degrees, (for example), shown to adhere to the cowls and/or base, as well as adhering to the rotational rings numerals 14a and 14b with or without treads/threads; thus can be applied to FIG. 23 thru FIGS. 45, 57, 58, and 59 respectively;

FIG. 56 the guard, cap shown as conical/cone, with multiple external vanes (vanes variance raised and/or lowered in degrees)—solid and/or partial form—convex nose guard (for example). Exterior of a series of turning vanes each extending an accurate distance of approximately 120 degrees—for example (degrees may vary depending on how many vanes are added to the conical/cone), shown to adhere to the cowls and/or base, as well as adhering to the rotational rings numerals 14a and 14b with or without treads/threads; thus can be applied to FIG. 23 thru FIGS. 45, 57, 58, and 59 respectively. This conical/cone is prime for deflecting shrapnel and thus returning shrapnel to the enemy without causing obstruction to the engine components and yet offer maximization of gas and or particle separation. Note: conical/cone may also take latitudinal lines/vanes—not exhibited.

The following device is the "Structural Support Mechanism/Frame System," for numerous craft, jets, turboprops, turboshaft, and other VTOL/VSTOL as well as engines power plants and the like—applications of this mechanism may also be for the combustor and or compressor for appropriate gas separation and or particle separation; with or without rotational system as well as with or without treads/threads (for example). Rotational system may be within structural support mechanism and or prior to the structural support mechanism and/or henceforth thereafter. Possible inclusion of guards, caps, and/or screens with this structural support mechanism;

FIG. 57 the rhombus structural support mechanism/form with or without internal rotational systems, with or without treads/threads—for example, the rotational system is shown rhombus—rectangular form as shown as FIG. 25 can be fixed/secured, adhered, attached inside inlet of a craft, as well as fastened to the nacelle exterior portion, and/or in the inlet extending outside the nacelle (metal/material). This is one of many configurations and applications of the structural support mechanism;

FIG. 58 the parallelogram structural support mechanism/form with or without internal rotational systems, with or without treads/threads—for example, the rotational system is shown rectangular form as FIG. 25 can be fixed/secured, adhered, attached inside inlet of a craft, as well as fastened to the nacelle exterior portion, and/or in the inlet extending outside the nacelle (metal/material). This is one of many configurations and applications of the structural support mechanism;

FIG. 59 the spherical/round structural support mechanism/form with or without internal rotational systems, with or without treads/threads—for example, the rotational system is shown rectangular form as FIG. 25 can be fixed/secured, adhered, attached inside inlet of a craft, as well as fastened to the nacelle exterior portion and/or in the inlet extending outside the nacelle (metal/material). This is one of many configurations and applications of the structural support mechanism;

The following apparatus are nose guards, caps shown in conical/cone form with various interchanging nose guards, caps—may take the configuration of convex, concave and or solid—for example. All nose guards are independent and thus interchangeable on all conical/cones. The following manipulations of the conical/cones, nose/guards, caps:

FIG. 60 nose guard, cap shown as conical/cone form is solid formation (cone pointed); such a nose guard, cap can be solid in whole and or partial and in kind.

FIG. 61 nose guard, cap shown as conical/cone form has multiple longitudinal and latitudinal lines/vanes form (cone pointed); such a nose guard, cap can be solid in whole and or partial and in kind.

FIG. 62 nose guard, cap shown as conical/cone form is solid formation (convex form); such a nose guard, cap can be solid in whole and or partial and in kind.

FIG. 63 nose guard, cap shown as conical/cone form has multiple longitudinal and latitudinal lines/vanes form (convex form); such a nose guard, cap can be solid in whole and or partial and in kind.

FIG. 64 nose guard, cap shown as conical/cone form is solid formation (rectangular form)); such a nose guard, cap can be solid in whole and or partial and in kind.

FIG. 65 nose guard, cap shown as conical/cone form has multiple longitudinal and latitudinal lines/vanes form (rectangular form); such a nose guard, cap can be solid in whole and or partial and in kind.

FIG. 66 nose guard, cap shown as conical/cone form is solid formation (concave form); such a nose guard, cap can be solid in whole and or partial and in kind.

FIG. 67 nose guard, cap shown as conical/cone form has multiple longitudinal and latitudinal lines/vanes form (concave form); such a nose guard, cap can be solid in whole and or partial and in kind Obviously, many modifications and variations of the present invention are possible in light of the above teachings. Thus, it is to be understood that, within the appended claims, the invention may be practiced otherwise than specifically described above.

I claim:

1. The process of a gaseous fluid cavity system, the process comprising of centrifugally separating particles from the gaseous fluid by a plurality of vanes providing divergence through force of said particles of gaseous fluid cavity yielding energy defined by the formula $S=Fkc^3 A/4\ hG \rightarrow Energy$ S=Thermodynamic—gaseous fluid said so particles is ingested in the gaseous intake cavity system and produced;

F=Force—induced as gaseous fluid said so particles is ingested and within gaseous intake cavity;

k=constant of energy—in a gaseous intake cavity;

$c^3$=a constant with 3 spatial dimension;

A=area of gaseous intake cavity;

4 h=forces defined as strong, weak, electromagnetic, and gravitational;

G=gravity—gravitational pull of said so forces and particles;

Energy=defined as kinetic, electromagnetic, electrostatic, electrochemical, and thermodynamic.

2. The process of a gaseous intake guard system having an elongated housing a longitudinal axis and a gaseous intake cavity for gas separating particles to purify said gaseous intake guard system comprising;

one or more vanes mounted defined also as guards and configured in communication within gaseous intake cavity of said housing;

housing configured to be in a predetermined shape;

Mount of one or more vanes also known as guards defined as a mechanical/frame system in said housing;

gaseous fluid undergoes centrifugation providing divergence through force in separating particles of gaseous intake cavity through mechanical/frame system for energy by receiving and discharging particles defined by the formula $S=Fkc^3 A/4\ hG \rightarrow Energy$ S=Thermodynamic—gaseous fluid said so particles is ingested in the gaseous intake cavity system and produced;

F=Force—induced as gaseous fluid said so particles is ingested and within gaseous intake cavity;

k=constant of energy—in a gaseous intake cavity;

$c^3$=a constant with 3 spatial dimension which may vary dimension or be dimensionless;

A=area of gaseous intake cavity;

4 h=forces defined as strong, weak, electromagnetic, and gravitational;

G=gravity—gravitational pull of said so forces and particles;

Energy=defined as kinetic, electromagnetic, electrostatic, electrochemical, and thermodynamic.

3. The process recited in claim 2, forces wherein defined kinetic energy.

4. The process recited in claim 2, forces wherein defined electrochemical.

5. The process recited in claim 2, forces wherein defined electrostatic.

6. The process recited in claim 2, forces wherein defined electromagnetic.

7. The process recited in claim 2, forces defined thermodynamic.

8. The process recited in claim 2, wherein the gaseous intake guard system is in fluid communication with a turbine.

9. The process recited in claim 2, wherein configuration is rectangular and opening is said the inlet.

10. The process recited in claim 2, wherein gaseous intake guard system is in fluid communication with a turbo ramjet.

11. The process recited in claim 2, wherein gaseous intake guard system is in fluid communication within a power plant.

12. The process of a gaseous intake guard system having a housing, with a gaseous intake cavity in producing gas separation process to purify particles for combustion comprising:

one or more perforated guards configured to be in communication with said housing;

perforated guards for gas separating particles in purifying process;

housing configured in predetermined shape;

particles compress and undergo centrifugation in the gaseous intake ward system through force in separating particles in the system and induce a passageway for energy by receiving and discharging particles from housing for leaner and cleaner gas defined by formula $S=Fkc^3 A/4\ hG \rightarrow Energy$ S=Thermodynamic—gaseous fluid said so particles is ingested in the gaseous intake cavity system and produced;

F=Force—induced as gaseous fluid said so particles is ingested and within gaseous intake cavity;

k=constant of energy—in a gaseous intake cavity;

$c^3$=a constant with 3 spatial dimension which may vary dimension or be dimensionless;

A=area of gaseous intake cavity;

4 h=forces defined as strong, weak, electromagnetic, and gravitational;

G=gravity—gravitational pull of said so forces and particles;

Energy=defined as kinetic, electromagnetic, electrostatic, electrochemical, and thermodynamic.

13. The process recited in claim 12, wherein perforated guards is cylindrical.

14. The process recited in claim 12, wherein system includes two guards spaced apart.

15. The process recited in claim 12, wherein two guards spaced apart system induce centrifugation of said particles.

16. The process recited in claim 12, wherein two guards spaced apart system mounted for rotational movement for centrifugation.

17. The process recited in claim 12, wherein gaseous intake guard system is in fluid communication with a turbine.

18. The process recited in claim 12, wherein guard is rectangular.

19. The process recited in claim 12, wherein guards constructed as a rectangular rig, within said cavity articles induce centrifugation process creating dual vortexes on each side for combustion.

20. The process of a gaseous intake guard system for a turbine having a housing and a gaseous intake cavity for gas separating particles to purify for leaner gas with noise reduction comprising:
one or more perforated guards congruent to housing;
one or more guards configured to be in predetermined shape;
one or more guards construct a conical configuration;
said conical configuration is perforated, conical said in communication within gaseous intake cavity;
centrifugation of gaseous fluid through force separating particles of gaseous intake cavity for receiving and discharging said particles defined by the formula $S = Fkc^3 A/4 \, hG \rightarrow Energy$ S=Thermodynamic—gaseous fluid said so particles is ingested in the gaseous intake cavity system and produced;
F=Force—induced as gaseous fluid said so particles is ingested and within gaseous intake cavity;
k=constant of energy—in a gaseous intake cavity;
$c^3$=a constant with 3 spatial dimension which may vary dimension or be dimensionless;
A=area of gaseous intake cavity;
4 h=forces defined as strong, weak, electromagnetic, and gravitational;
G=gravity—gravitational pull of said so forces and particles;
Energy=defined as kinetic, electromagnetic, electrostatic, electrochemical, and thermodynamic.

21. The process recited in claim 20, where perforated conical defined as open triangular guards are saw tooth.

22. The process recited in claim 20, wherein two guards are perforated, cylindrically, spaced apart, and mounted for rotational movement wherein between guards defines centrifugation.

23. The process recited in claim 20, wherein one or more guards are stationary.

24. The process recited in claim 20, wherein one or more guards retract.

25. The process recited in claim 20, wherein one or more guards said construct into perforated conical formation wherein between defines centrifugation.

26. The process recited in claim 20, wherein one or more guards said perforated conical formation is rotational.

27. The process recited in claim 20, wherein one or more guards spaced apart perforated cylindrically and mounted for rotational movement wherein between guards defines centrifugation can be a independent system.

28. The process recited in claim 20, wherein one or more guards of said construct into a perforated conical formation wherein defines centrifugation can be a independent system.

29. The process recited in claim 20, wherein guards and said conical configured are independent and interchanged.

30. The process recited in claim 20, wherein said housing has an end location for discharge of particles, wherein end location is a nozzle.

* * * * *

UNITED STATES PATENT AND TRADEMARK OFFICE
CERTIFICATE OF CORRECTION

PATENT NO.         : 8,876,930 B2                                    Page 1 of 1
APPLICATION NO.    : 12/927487
DATED              : November 4, 2014
INVENTOR(S)        : Marina Ellen Marinella Pavlatos It is certified that error appears in the above-identified patent and that said Letters Patent is hereby corrected as shown below:

In the Specification

1.) COLUMN NUMBER 4, Line # 39 – SEQUENCE CORRECTION, Starting with "FIG." noted in Line # 39 thru Line # 42 ending with the word "forms;" to be omitted.

2.) COLUMN NUMBER 12, Line # 5 – Starting with "FIG. 40 rotational ring shown with..." must start on Line # 6.

3.) COLUMN NUMBER 31, Line # 45 – Starting with "FIG. 36 rotational ring...." must start on Line # 46.

In the Claims

4.) COLUMN NUMBER 36, CLAIM # 12 - Line # 35 – "ward" corrected to "guard...".

5.) COLUMN NUMBER 37, CLAIM # 19 - Line # 2 – "articles" corrected to "particles...".

6.) COLUMN NUMBER 37, CLAIM # 20 - Line # 18 – Font Correction – "S= Fkc$^3$ A/4h G→Energy".

Signed and Sealed this
Sixteenth Day of December, 2014

Michelle K. Lee
*Deputy Director of the United States Patent and Trademark Office*